US012590705B2

(12) United States Patent
Baird

(10) Patent No.: US 12,590,705 B2
(45) Date of Patent: Mar. 31, 2026

(54) ELECTRIC FIRE APPARATUS AND METHOD OF USE THEREOF

(71) Applicant: Paul Christopher Baird, Tanworth-in-Arden (GB)

(72) Inventor: Paul Christopher Baird, Tanworth-in-Arden (GB)

( * ) Notice: Subject to any disclaimer, the term of this patent is extended or adjusted under 35 U.S.C. 154(b) by 757 days.

(21) Appl. No.: 17/920,586

(22) PCT Filed: Apr. 16, 2021

(86) PCT No.: PCT/GB2021/050915

§ 371 (c)(1),
(2) Date: Oct. 21, 2022

(87) PCT Pub. No.: WO2021/214432

PCT Pub. Date: Oct. 28, 2021

(65) Prior Publication Data

US 2023/0139825 A1 May 4, 2023

(30) Foreign Application Priority Data

Apr. 22, 2020 (GB) ..................................... 2005889

(51) Int. Cl.
*F24C 7/00* (2006.01)
*F21S 10/04* (2006.01)

(52) U.S. Cl.
CPC .............. *F24C 7/004* (2013.01); *F21S 10/04* (2013.01)

(58) Field of Classification Search
CPC ........ F24C 7/004; F24C 3/006; F24B 1/1808; F21S 10/04
See application file for complete search history.

(56) References Cited

U.S. PATENT DOCUMENTS 5,195,820 A 3/1993 Rehberg
12,375,640 B2 * 7/2025 Van Schie ............ H04N 5/2628

FOREIGN PATENT DOCUMENTS

| | | | | |
|---|---|---|---|---|
| CA | 3024400 A1 * | 12/2007 | | |
| CN | 203517972 U * | 4/2014 | | |
| CN | 104697026 A | 6/2015 | | |
| EP | 1233237 A1 | 8/2002 | | |
| EP | 2807426 B1 * | 8/2016 | .............. | F24C 7/004 |
| FR | 3100873 A1 * | 3/2021 | .............. | F24C 7/004 |
| GB | 361608 A | 11/1931 | | |
| GB | 2151772 A | 7/1985 | | |
| GB | 2458216 A | 9/2009 | | |
| GB | 2478897 A * | 9/2011 | ............ | F24F 1/0083 |

(Continued)

OTHER PUBLICATIONS

Great Britain Search Report, GB2005889.7, dated Sep. 16, 2020.

(Continued)

*Primary Examiner* — Woody A Lee, Jr.
(74) *Attorney, Agent, or Firm* — Wiggin and Dana LLP

(57) ABSTRACT

An electric fire apparatus (10) is provided, having an improved simulated fire effect. The electric fire apparatus (10) comprising a bed base (14*a*) which is at least in part light-transmissible. The electric fire apparatus (10) also has a holographic mesh element (18) as herein before defined which divides the bed base (14*a*) into a front bed base portion (42*a*) and a rear bed base portion (42*b*). At least one light source (50) is provided for directing light through the front and/or rear bed base portions(42*a*,42*b*).

16 Claims, 4 Drawing Sheets

(56) References Cited

FOREIGN PATENT DOCUMENTS

| | | | | | |
|---|---|---|---|---|---|
| GB | 2493228 | A | * | 1/2013 | ............ F24F 5/0096 |
| GB | 2467297 | A | | 7/2023 | |
| WO | 2002077533 | A1 | | 10/2002 | |
| WO | WO-2007140817 | A1 | * | 12/2007 | .............. F24C 7/004 |
| WO | 2010057354 | A1 | | 5/2010 | |
| WO | WO-2021053019 | A1 | * | 3/2021 | .............. F21S 10/04 |

OTHER PUBLICATIONS

International Search Report, PCT/GB2021/050915, dated Jul. 9, 2021.

International Preliminary Report on Patentability, PCT/GB2021/050915, dated Oct. 25, 2022.

British Examination Report under Section 18(3) for corresponding Application No. GB 2005889.7 dated Jan. 24, 2024.

British Examination Report under Section 18(3) for corresponding Application No. GB 2005889.7 dated Oct. 19, 2023.

* cited by examiner

ELECTRIC FIRE APPARATUS AND METHOD OF USE THEREOF

CROSS-REFERENCE TO RELATED APPLICATIONS

This application is a national phase entry under 35 U.S.C. § 371 of International Application PCT/GB2021/050915, filed Apr. 16, 2021, which claims priority to GB Patent Application No. 2005889.7, filed Apr. 22, 2020, each of which are herein incorporated by reference in their entirety.

TECHNICAL FIELD

The present invention relates to an electric fire apparatus, which provides an improved simulated fire effect. The present invention also relates to a method of use of such an electric fire apparatus to provide a simulated fire effect.

BACKGROUND

A warm, crackling fireplace is a welcome sight in the colder months. However, a live fireplace has many drawbacks, from health, environmental, safety, financial and insurance perspectives. A fireplace must also be cleaned out regularly, and the chimney swept annually. When in-use, the fireplace should be supervised at all times, particularly when children are present.

An alternative is to provide an imitation fireplace which provides a simulated fire with fewer to none of the mentioned drawbacks. In some imitation fireplaces, flames may be simulated by lit fabric moved by jets of air. Alternatively, flames may be projected onto a screen. However, the simulated fire provided by such imitation fireplaces is rarely realistic.

Furthermore, the casing of these imitation fireplaces is typically bulky and enclosing to prevent or inhibit access to the inner components. This means that imitation fireplaces may not necessarily be retrofitted to any fireplace. Additionally the casing may dim the simulated fire effect.

The present invention seeks to provide a solution to these problems.

SUMMARY

According to a first aspect of the present invention, there is provided an electric fire apparatus having an improved simulated fire effect, the apparatus comprising a bed base which is at least in part light-transmissible, a holographic mesh element as hereinafter defined which divides the bed base into a front bed base portion and a rear bed base portion; and at least one light source for directing light through the front and/or rear bed base portions.

The phrase 'holographic mesh element' used herein and throughout is defined as or intended to mean a light-reflective pliantly-flexible mesh. Preferably, such a mesh is formed from a, preferably plastics, mesh substrate having a, preferably light-reflective, for example metallic, coating deposited thereon or thereover. Such a mesh is commonly termed a 'holographic mesh', and is used in stage show and theatre productions. In such scenarios, the mesh element has or provides a holographic effect which occurs when light and/or an image projected onto the mesh element appears to be "floating" or "conjured out of thin air" due to the mesh being invisible or substantially invisible in-use to the human eye.

In other words, an electric fire apparatus may be provided, having an improved simulated fire effect, the apparatus comprising a bed base which is at least in part light-transmissible, a holographic mesh element comprising an underlying structure and a coating applied to the underlying mesh structure, the holographic mesh element dividing the bed base into a front bed base portion and a rear bed base portion; and at least one light source for directing light through the front and/or rear bed base portions.

The aforementioned mesh element, and therefore the in-use simulated fire effect, is positioned relative to the bed base where or substantially where a fire might be expected in a real fireplace. This may improve realism relative to conventional artificial fireplaces in which a projection screen extends from behind and/or in front of the imitation fuel. In these cases, the simulated fire can seem to require no fuel to exist, which is also unrealistic to an observer.

Preferably, the electric fire apparatus further comprises an at least in part light-transmissible second bed base above or below the first said bed base. Additional layers of depth add to the realism of the simulated fire.

Beneficially, the second bed base may comprise a transparent fuel support element. Furthermore, the first bed base may comprise a fuel support element having a transparent portion and a translucent portion. Having at least one of the bed bases being partially or fully transparent across some or all the extent of the at least one bed base increases the amount of light available to provide the simulated fire effect. The translucent portion occludes from sight the at least one light source, which would otherwise reduce the realism. The translucent portion may have an additional function of enabling or providing additional flame or fire patterns within the bed bases.

Advantageously, the transparent portion may be shaped as an elongate strip, positioned in-use below the holographic mesh element for permitting light from the at least one light source to be directed therethrough onto the holographic mesh element to provide a simulated flame effect. The transparent strip enables more light through compared to the translucent section to provide a crisp and/or bright illusion of flames on the mesh element.

Furthermore, the strip may be positioned rearwards relative to the holographic mesh element. Light is projected forward onto the screen. This typically results in more light reaching the viewer's eye, providing a brighter image compared with rearward-projected light reflected on the mesh element. This also reduces the risk of illuminating the back of the electric fire apparatus, which would cause the mesh element to be more visible.

Preferably, the electric fire apparatus further comprises an opaque and/or translucent partitioning element which occludes the transparent portion of the fuel support element from view when the electric fire apparatus is in-use. Additionally, the first and second bed bases may be spaced apart by a distance, and the partitioning element may extend or substantially extend over at least a majority of the distance between the first and second bed bases. The relative height and positioning of the partitioning element relative to the transparent portion means that the user is not able to see the transparent portion and/or see through the transparent portion into the light chamber below. This improves the realism.

Preferably, the electric fire apparatus further comprises an imitation fuel element which is at least in part light-transmissible. There is at least one, and preferably a plurality of imitation fuel elements which resemble coals, driftwood, or in the preferred embodiment, logs. The fuel elements may be fully or partially light-transmissible if emulating partially burning or consumed fuel.

Beneficially, the fuel support element of the first bed base may comprise a further transparent portion and the imitation fuel element may be positionable or positioned on the said further transparent portion for receiving light through the said further transparent portion. The further transparent portion enables more light to reach and illuminate the fuel element.

Advantageously, the further transparent portion may be or be substantially complementarily shaped to the imitation fuel element, and the imitation fuel element may be at least in part translucent and/or semi-transparent such that when it overlies the further transparent portion, the further transparent portion may be or be substantially occluded. The fuel element serves a further function similar to the partitioning element, in that it occludes from view the further transparent portion and/or the light chamber beneath.

Advantageously, the first said bed base may further comprise a second said holographic mesh element. Alternatively, at least one of the first said bed base and the second said bed base may further comprise a second said holographic mesh element. A second holographic mesh element may be associated with the first bed base and/or the second bed base, or at least one mesh element may be associated with each of the first bed base and the second bed base.

Optionally, the second said holographic mesh element may be pliable. This provides a three-dimensional holographic mesh which adds additional depth, and thus realism to the simulated fire. Furthermore, the second holographic mesh element can be draped or wrapped under, over, around or any combination thereof the imitation fuel element, if provided. Ease of transport is also increased.

Optionally, at least the first said bed base may slope upwardly in a front to back direction of the apparatus. Additionally or alternatively, the second bed base may slope upwardly in a front to back direction of the electric fire apparatus. One or both bed bases or at least their fuel support elements sloping upwards provides the illusion of a depth in shallow fireplace and/or better emulates the pile-up of fuel in a small space.

Furthermore, the first said bed base may be parallel to the second bed base. Where both bed bases or at least their fuel support elements are parallel and horizontal, the risk of the imitation fuel element accidentally moving, such as by sliding, is reduced. Where both bed bases, or at least their fuel support elements are parallel and sloping, the vertical spacing between the bed bases remains the same. This reduces the risk of the upper fuel elements providing the illusion of "floating in the air" and not resting on the lower fuel elements.

Beneficially, the first said holographic mesh element may be extendable in a plane, said plane extending non-perpendicularly to the first said bed base. A plane provides a crisper image.

Optionally, the first said holographic mesh element may be pliable. The mesh element can be folded, facilitating transport and reducing the risk of damage during transport prior to assembly of the electric fire apparatus.

Beneficially, the electric fire apparatus may further comprise a housing having a back wall, a ceiling and two side walls. Optionally, the housing may further comprise a front screen. The first mesh element can be hung from or engaged with the ceiling and/or held taut by or between the side walls. The optional front screen may prevent or inhibit damage to the fire apparatus by stopping or restricting access. Additionally or alternatively, the front screen prevents or inhibits a user from inserting their head into fire apparatus such that there is a reduced risk of damage to the eye due to a strong light source.

Furthermore, the electric fire apparatus may be provided as a kit of parts. The ease of transport is increased when the electric fire apparatus is in a deconstructed state.

According to a second aspect of the present invention, there is provided a method of providing an improved simulated fire effect, the method comprising the steps of: a] providing an electric fire apparatus; and b] shining light through the or each bed base. A more realistic illusion of a fire is provided.

According to a third aspect of the present invention, there is provided a method of providing an improved simulated fire effect, the method comprising the step of dividing a bed base using a holographic mesh element. The simulated fire is more realistically positioned.

According to a fourth aspect of the present invention, there is provided an electric fire apparatus having an improved simulated fire effect, the apparatus comprising a first bed base which is at least in part light-transmissible; an at least in part light-transmissible second bed base above or below the first bed base; and at least one light source for directing light through the bed bases. A plurality of bed bases provides more visual depth, thereby increasing the realism.

BRIEF DESCRIPTION OF THE DRAWINGS

The invention will now be more particularly described, by way of example only, with reference to the accompanying drawings, in which.

DETAILED DESCRIPTION

Figure 1:
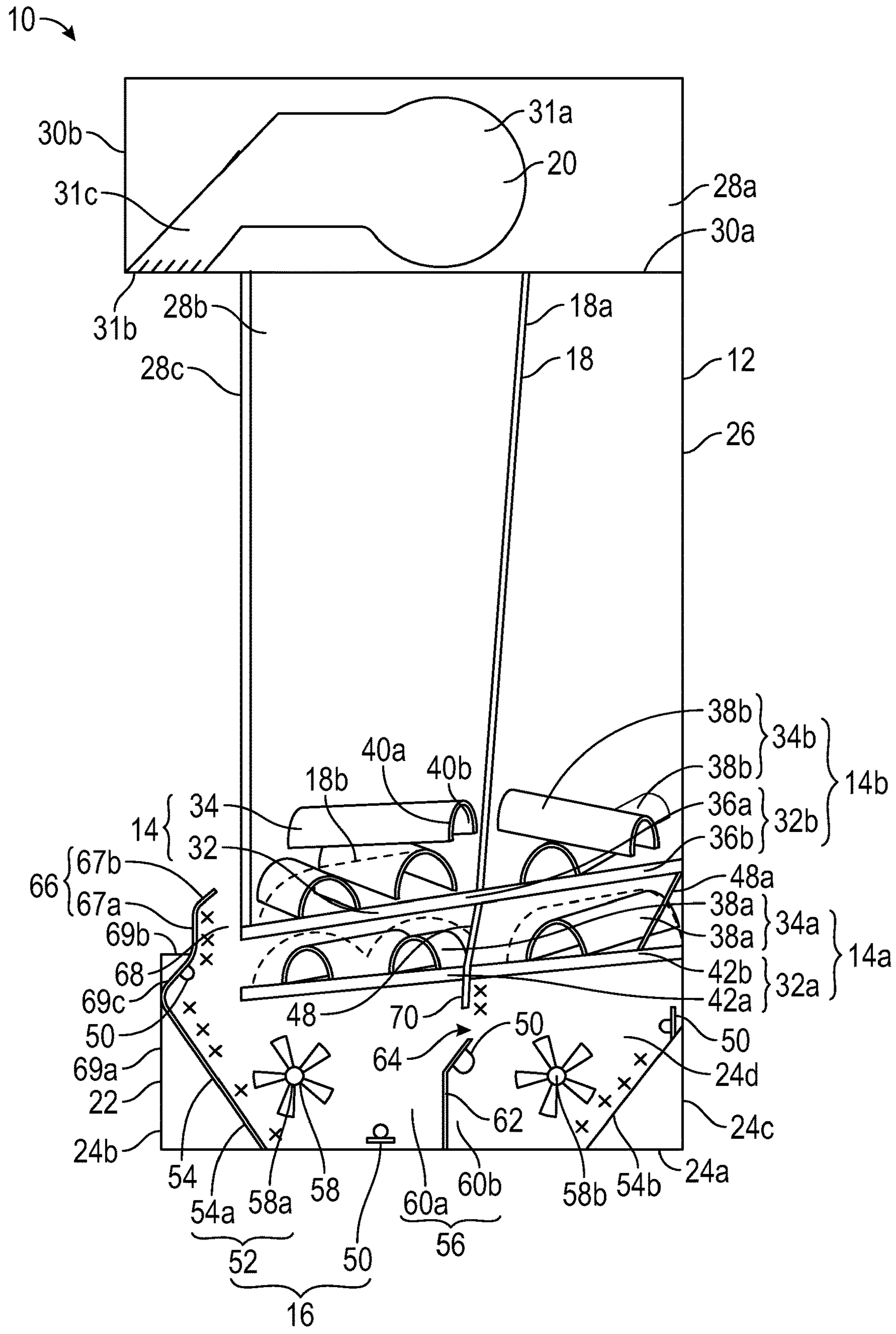
FIG. 1 shows a cut away side view of an embodiment of an electric fire apparatus in accordance with the first aspect of the invention.

Referring firstly to FIG. 1, there is provided an electric fire apparatus indicated globally at 10 which is able to provide an improved simulated fire effect. The electric fire apparatus 10 may be referred to as an imitation fire, imitation fireplace, or simulated fire. The electric fire apparatus 10 comprises a housing or housing element 12; at least one, and more preferably, two bed bases 14; and a lighting means 16 having at least one light source. The lighting means 16 preferably directs light towards and/or through the bed bases 14 or parts thereof, as shown. The electric fire apparatus 10 also comprises at least one holographic mesh element 18, and a heating element 20 although any of these features may be omitted. The electric fire apparatus 10 also preferably comprises one or more electrical control components, not shown.

The term "fire effect" is used herein and throughout to encompass or mean both a burning fuel or ember effect, and flames. However, it could be envisioned that the apparatus may only provide an improved flame effect or only burning embers effect, such as hot coals, without any flames, or with flames restricted to the bed bases.

The housing 12 is preferably a shell or rigid casing. The housing 12 has at least a ground or grounding portion 22. The grounding portion 22 may have a ground-facing section 24*a*, a front facing section or wall 24*b* and a rear section or wall 24*c*, extending from the ground-facing section 24*a*. The grounding portion 22 may optionally also have lateral sections or walls 24*d*, only one of which is visible in FIG. 1, as the other lateral section is cutaway for clarity. Preferably, the front facing section or wall 24*b* and the rear section or wall 24*c* are planar and, optionally, parallel with each other. They are also preferably similarly dimensioned. Similarly, the lateral walls 24 are preferably planar and parallel with each other, and may be similarly dimensioned. As such, the grounding portion 22 in plan view is or is substantially a rectangle or a square, but this feature may be omitted and alternative shapes in plan view may be envisioned, such as curved, partly curved, non-curved, polygonal such as a hexagon, octagon, pentagon, a trapezium or trapezoid, regular, irregular, truncated or chamfered, or any other desirable shape.

Preferably, the housing 12 also has a back wall 26 which extends from the rear wall 24*c*; a top portion 28*a*; one, or preferably, at least two side walls 28*b*, only one of which is shown in FIG. 1; and a front screen 28*c*; although any or all of these features may be omitted in an alternative embodiment. A lower surface of the top portion 28*a* may provide a ceiling 30*a*, and a front surface 30*b*. The front surface 30*b* of the top portion 28*a* is vertical or substantially vertical but may be sloped or angled, downwards or upwards in a back to front direction of the electric fire apparatus. In the present embodiment, the heating element 20 may be receivable, received or contained within a chamber 31*a* in the top portion 28*a*. The top portion 28*a* may comprise a further ventilation outlet, opening, port, aperture or exit 31*b* through which air may be blown out and/or heat may be radiated by the heating element 20. A channel or corridor 31*c* connects the chamber 31*a* to the exit 31*b*. An internal wall of the channel 31*a* may be angled downward in a back to front direction of the apparatus 10, to orient or direct hot air from the heating element 20 downwards and/or to the front. Said exit 31*b* may be in the ceiling 30*a*, as shown, although the exit may be provided in any other portion of the electric fire apparatus instead, such as in the front surface. Preferably, the ceiling 30*a* has at least one ventilation inlet, aperture, portion, opening or gap, not shown, at least one of which may optionally be positioned rearward relative to the or at least one holographic mesh element 18. This at least one aperture enables the heating element 20 to draw air in therethrough. The exit 31*b* may be forward relative to the mesh element 18.

The front screen 28*c*, if provided, is preferably positioned rearward of the front facing section 24*b*, and the two are preferably spaced apart from each other. Thus, a gap may be formed therebetween, the purpose of which will be discussed in more detail below.

The rear wall 24*c* extends up to the or the highest bed base 14. The back wall 26 is considered to correspond to an in-use visible back portion of the housing 12 and/or is considered to start where the rear wall 24*c* ends. The back wall 26 and/or side walls 28*b* are preferably integrally formed with the rear wall 24*c* and/or the lateral sections 24*d* respectively, but separably connectable, or connected may be envisioned. This would enable the apparatus to be fitted into a cavity with the option of omitting most of the housing.

The housing 12 has the following functions, although any function may be omitted. The first function is to provide a structure for receiving, containing, at least partly surrounding some or all components of the electric fire apparatus 10. The rear wall 24*c* and/or lateral sections 24*d* may have at least one bracket, batten or support structure, groove or slit, or any combination thereof, not shown, to support the or each bed base 14 above the ground and/or above the lighting means 16. The housing 12 also has a protective function. In particular, the housing 12 protects the any internal components by preventing or inhibiting access to said components, such as the lighting means 16 or at least part thereof. The housing 12 may protect the viewer by preventing or inhibiting any direct eye-contact with a light of the lighting means 16, as some types of light could result in damage to the eye. The housing 12 also has a positioning function as the housing 12 enables the electric fire apparatus 10 to be positionable on a surface in a stable and desirable position and orientation. The position and/or orientation of some internal components relative to a viewer is an important factor in the realism of the simulated fire effect. The housing 12 also has an aesthetic function. The outwardly appearance may resemble that of a real fireplace. Furthermore, the back wall 26 may optionally be coloured and/or textured to imitate the look of the back wall of a real fireplace, such as a brick structure. Alternatively or additionally, the colour and/or texture of the back wall 26 may be important in improving the realism of any holographic and/or simulated flames, for example by being black or a dark colour. The back wall 26 is at least in part, or preferably, entirely black in the present embodiment, although this feature may be omitted.

One or both said bed bases 14 in-use visually provide the illusion of burning fuel. As such, each bed base 14 may be referred to as an ember bed base, a fuel bed base, a fuel bed or tray, a level, a tier, an imitation fuel portion or holder. The or each bed base 14 comprises a fuel support element 32 and imitation fuel 34, although any one of the features may be omitted. The bed bases 14 are at least partly contained, surrounded, and/or receivable by the housing 12.

Preferably at least one said bed base 14 is positionable or positioned in or above the grounding portion 22 and/or lighting means 16 although this may not necessarily be the case. As the grounding portion 22 encloses or substantially encloses the lighting means 16, light is preferably directed through the bed bases 14 when in use such that the viewer preferably never looks at a light source directly. In other words, each bed base 14 is positioned along or interposed on one or more light channels. A light channel is defined as the path along which a light photon or beam may travel upon leaving a light source until it is reaches a viewer's eye. In other words, one or preferably all bed bases 14 are at least partly light-transmissible and/or are illuminable from below.

In this embodiment, there are preferably two bed bases 14 such that there is a first bed base 14*a* and a second bed base 14*b*. The second bed base 14*b* may be positioned or positionable below or, preferably, above the first bed base 14*a* such that there is a lower bed base and an upper bed base. The first bed base 14*a* may here be referred to as a lower bed base or a bottom bed base as it is preferably below. Similarly, the second bed base 14*b* may also be referred to as an upper or higher bed base, a further bed base or a top bed base. The second bed base 14*b* will be hereafter described first, due to being simpler than the first bed base 14*a*. If only one bed base is provided, it is preferably the first bed base 14*a*, although the second bed base may be considered.

The second bed base 14*b* comprises a fuel support element 32*b* and imitation fuel 34*b* although any of these features may be omitted. The fuel support element 32*b* is for holding, supporting or receiving the said imitation fuel 34*b*. Furthermore, the fuel support element 32*b* and imitation fuel 34*b* are separably engageable with each other but may alternatively be non-separably engageable, and/or integrally formed with each other.

The fuel support element 32*b* preferably comprises a front bed base portion 36*a* and a rear bed base portion 36*b*, although either may be omitted. The front bed base portion 36*a* may be defined as the portion of the bed base 14*b* which is in front of the holographic mesh element 18 and/or simulated flames. In other words, the front bed base portion 36*a* is preferably furthest away from the back wall 26 and/or closest to the viewer. Conversely, the rear bed base portion 36*b* is the portion of the bed base 14 which may be at the rear of the holographic mesh element 18 and/or simulated flames. In other words, the rear bed base portion 36*b* is closest to the back wall 26 and/or furthest away from the viewer when in-use. In the present embodiment, each of the front and rear bed base portions 36*a*,36*b* are preferably planar or substantially planar. As shown, the front and rear bed base portions 36*a*,36*b* are co-planar and/or integrally formed with each other. They may even be considered to form planar or substantially planar sheets or plates, although curved portions may be envisioned.

The front and rear bed base portions 36*a*,36*b* preferably have unequal depths, as shown, but equal depths may be envisioned. In particular, the depth of the front bed base portions 36*a* and/or the rear bed base portions 36*b* may be between 2 cm and 50 cm or substantially 50 cm for each section. More preferably each of the front bed base portions 36*a* and/or the rear bed base portions 36*b* or the combination thereof may be between 15 cm and 30 cm. Most preferably, the front bed base portions 36*a* is about 10 cm deep or from a front longitudinal edge to a rear longitudinal edge direction. The rear bed base portion 36*b* is similarly most preferably about 10 cm deep, or again in a front longitudinal edge to a rear longitudinal edge direction. The width or longitudinal extent of the front and rear bed base portions 36*a*,36*b* from one side wall 28*b* and/or lateral wall 24*d* to the opposing side wall and/or lateral wall will typically be in a range of 30 cm to 300 cm. More preferably, the longitudinal extent is in the range of 100 cm to 200 cm.

For clarity, the extent from one lateral wall 24*d* to the other lateral wall 24*d* will be referred to as a width, longest extent or a longitudinal extent. The extent from the front facing section 24*b* to the rear section 24*c* will be referred to as the depth, shorter extent or lateral extent. The extent from the ground-facing section 24*a* to the ceiling 30*a* may be referred to as the height or thickness. This terminology will be maintained for clarity, even in situations where the electric fire apparatus 10 has a greater front-to-back lateral extent than a lateral-side-to-lateral-side longitudinal extent.

The fuel support element 32*b* is preferably sloping or angled, or forms an angle relative to the horizontal plane. Furthermore, the second bed base 14*b*, and in particular the fuel support element 32*b* thereof, slopes upwardly in a front to back direction of the electric fire apparatus 10, but horizontal or sloping downwardly may be envisioned. In a shallower electric fire apparatus 10, the sloping fuel support element 32*b* causes the imitation fuel 34*b* to be potentially more visible and/or provide a more realistic imitation of logs piling up in a shallow fireplace.

Figure 2:
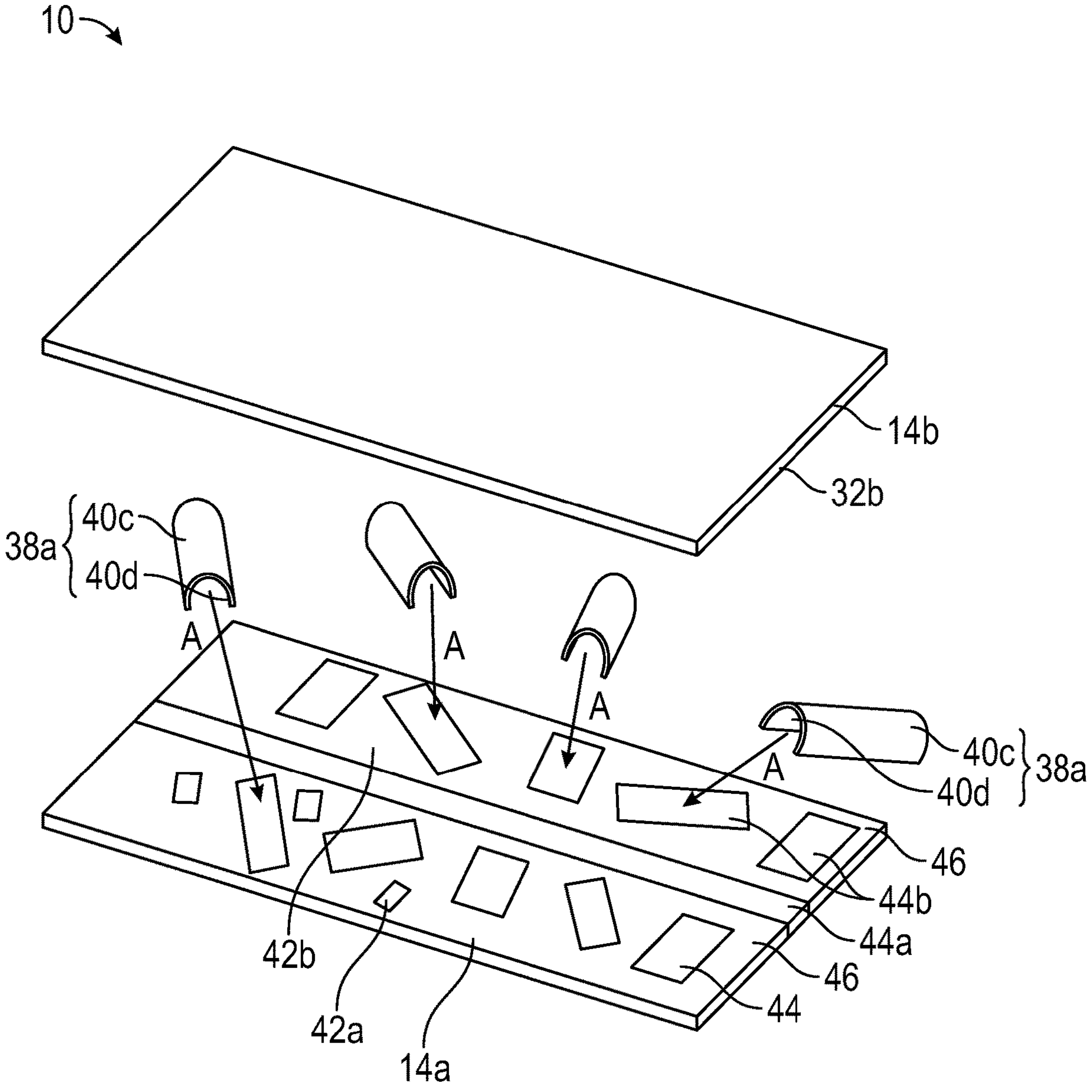
FIG. 2 shows a perspective exploded view of the fuel support element and imitation fuel elements of the first bed base, and the fuel support element of the second bed base of the electric fire apparatus of FIG. 1.

At least a major portion of, and preferably all the fuel support element 32*b* is transparent for letting light therethrough. In other words, the fuel support element 32*b* of the second bed base 14*b* is transparent. As such, each bed base portion 36*a*,36*b* is at least in part light-transmissible. The fuel support element 32*b* may be formed of plastics, glass, metals, or any combination thereof. The fuel support element 32*b* may comprise acrylics. The fuel support element 32*b* may be clear or colourless. Alternatively, the fuel support element 32*b* may be tinted or coloured. The fuel support element 32*b* is square or preferably rectangular as shown in FIG. 2. The fuel support element 32*b* may be considered to be a sheet or plate.

The imitation fuel or display fuel 34*b* is preferably separate and/or separable from the planar fuel support element 32*b*. The imitation fuel 34*b* comprises at least one, and preferably a plurality of imitation fuel elements 38*b*. The or at least one said fuel element 38*b* is an imitation log or preferably a portion of an imitation log. Here, each fuel element 38*b* is a rounded half-log. Furthermore, each fuel element 38*b* is preferably hollow, such that each fuel element 38*b* has a curved shape and/or C-shape in latitudinal cross-section. Each log-shaped or half-log shaped fuel element 38*b* has an outer surface 40*a* and an inner surface 40*b*. Each log-shaped or half-log shaped fuel element 38*b* may optionally have end walls, not shown. Preferably, the imitation fuel 34*b* is laid on top of the fuel support element 32*b*, with the rounded outer surface 40*a* facing the viewer when the electric fire apparatus 10 is in-use. Each fuel element 38*b* may be formed by moulding. Each imitation fuel element 38*b* is preferably distinct from at least another imitation fuel element 38*b*, but it could be envisioned that two or more fuel elements may be connectable, connected or integrally formed with each other. One or more fuel elements 38*b* may be at least partly formed of and/or covered by a coloured material, such as paint. The fuel elements may even be decorated and/or shaped to resemble real logs, thereby improving realism or aesthetics. The imitated real log may be a burning log, a partly consumed log or an unburnt log. The or each fuel element 38*b* is at least partly light-transmissible to allow or permit light therethrough. One or more fuel elements 38*b* may be transparent, semi-transparent, translucent, or any combination thereof, although opaque or partly opaque may be envisioned. For example, an imitation fuel element 38*b* may be translucent at one end and opaque at the other end to imitate a real log, only half of which is on fire. There may even be a plurality of different fuel elements 38*b* emulating real fuel at different stages of combustion.

The first bed base 14*a* is similar to the second bed base 14*b*, having similar imitation fuel 34*a* and fuel support element 32*a*, although any of these features may be omitted. The imitation fuel 34*a* similarly comprises one or more imitation fuel elements 38*a*. Each imitation fuel element 38*a* may be a half-log, as in the second bed base 14*b*, having outer surface 40*c* and inner surface 40*d*, see FIG. 2. The fuel support element 32*a* comprises a similar front bed base portion 42*a* and a rear bed base portion 42*b*, although either portion could be omitted. Detailed description of the common features is omitted for brevity. All the front bed base portions 36*a*,42*a* of all the bed bases 14 may collectively be referred to as the front beds. Similarly all the rear bed base portions 36*b*,42*b* may be collectively referred to as the rear beds.

Preferably the front bed base portion 42*a* and a rear bed base portion 42*b* of the first bed base 14*a* form a fuel support element 32*a*, similar to the fuel support element 32*b* of the second bed base 14*b*. Detailed description of the common features is omitted for brevity. The first bed base 14*a*, and in particular the fuel support element 32*a* thereof preferably slopes upwardly in a front to back direction of the apparatus 10, although horizontal or sloping downwardly in the front to back direction may be envisioned. The first bed base 14*a* is preferably parallel to the second bed base 14*b*, as shown, however, a non-parallel arrangement may be envisioned, for instance if one bed base is horizontal or angled at a different angle compared to the other bed base.

Similarly to the second bed base 14*b*, the first bed base 14*a* has at least one transparent portion, section or part 44. However, unlike the second bed base 14*b*, the first bed base 14*a*, and more preferably, each of the front and back bed base portions 42*a*,42*b* thereof, also comprises at least one portion, section or part 46 which is diffuse, frosted, semi-transparent or translucent, as shown in FIG. 2. In other words, the fuel support element 32*a* has one or more transparent portions 44 and one or more translucent portions 46, although either feature could be omitted. The at least one translucent portion 46 allows some light therethrough but less than the transparent portion or portions 44. The translucent portion 46 may be formed, for example, from acrylics, plastics, glass or a combination thereof. A portion thereof may be treated with a chemical to produce a frosting effect. Turpentine or an acid might achieve this result. Additionally or alternatively, a translucent film or foil may be applied. If only one bed base is provided, it is preferably the first bed base 14*a*, so that the translucent portion or portions 46 may at least partially occlude or obscure the lighting means 16 below from sight.

As shown in FIG. 2, the said transparent portion 44 is elongate and/or shaped as a strip 44*a*. The strip 44*a* may extend along all or at least a major portion of the length or width of the first bed base 14*a*, but any extent of the width and/or even depth may be envisioned. The strip 44*a* is positioned in-use below the or a said mesh element 18 for permitting light from the at least one light source to be in-use directed therethrough onto the said mesh element 18 to provide a simulated flame effect. The transparent portion 44 is also preferably positioned rearwards relative to the mesh element 18, or at least is rearwards relative to where the mesh element 18 meets or ends above the second fuel bed 14*b*. The transparent portion may alternatively be overlapping with and/or be forwards relative to the mesh element. The strip 44*a* is a rectangle in plan view and/or in cross-section but alternative shapes in plan view and/or cross-section may be envisioned, such as curved, non-curved, circular, oval, ovoid, part curved, or polygonal, whether regular, irregular, such as a trapezium or trapezoid. The strip 44*a* is preferably considered to be part of the rear bed base portion 42*b*. The strip 44*a* is integrally formed with both portions 42*a*,42*b* of the first bed base 14*a*. The thickness of the strip 44*a* preferably matches the thickness of the front bed base portion 42*a* and/or the rear bed base portion 42*b*.

Instead of or in addition to the strip 44*a*, the fuel support element 32*b* preferably has one or more transparent portions 44, each of which may be referred to as a further transparent portion 44*b*. Here, each of the front and/or rear bed base portions 42*a*,42*b* has at least one such further transparent portion 44*b*. The plurality of transparent portions 44*b* is preferably interspersed amongst the at least one translucent portion 46 of the fuel support element 32*b* and/or of each base portion 42*a*,42*b*. In other words, each further transparent portion 44*b* may be or be substantially surrounded by translucent material.

Each or at least one said further transparent portion 44*b* may match, or be or be substantially complementarily shaped, dimensioned and/or sized to a corresponding said imitation fuel element 38*a*. The or each fuel element 38*a* may be positionable or positioned on, superposed, overlaid on, above, and/or around the or each said further transparent portion 44*b*, as indicated by arrows A in FIG. 2. This arrangement enables light to be directed through the said further transparent portion 44*b* and to be received in the fuel element 38*a*. As each fuel element 38*a* is preferably at least in part translucent and/or semi-transparent, when it overlies the or each further transparent portion 44*b*, the further transparent portion 44*b* is or is substantially occluded from view.

The electric fire apparatus 10 further comprises at least one partitioning element 48, shown in FIG. 1, but this feature may be omitted. The partitioning element 48 has a first function of at least partially occluding, obscuring, concealing or hiding the lighting means 16 or part thereof and/or one or more of the transparent portions 44 of the first fuel support element 32*a* from view when the electric fire apparatus is in-use. In particular, occlusion of the strip 44*a* prevents or inhibits the lighting means 16 or part thereof from being directly viewable therethrough, and more preferably from any angle. As such, the, preferably coloured, partitioning element 48 may be at least partially opaque, and/or may be at least partially translucent, semi-transparent, or has a frosted effect. For example, the partitioning element 48 may have a translucent portion adjacent to an opaque portion. However, a fully opaque partitioning element may reduce the realism. By being at least partly translucent, frosted and/or semi-transparent, the partitioning element 48 is more invisible and/or may even increase realism by providing a substrate upon which to project light. Any light projected thereonto provides an additional layer of depth to the holographic and/or simulated fire effect. The partitioning element 48 may be referred to as a partition, an occluding means or element, a screen, a concealing element, or a curtain.

The partitioning element 48 is positionable or positioned in-use below, or here, above the first fuel support element 32*a*. Furthermore, the partitioning element 48 is positionable or in-use positioned above and/or, preferably, below the second fuel support element 32*b*. The first and second bed bases 14*a*,14*b* are spaced apart by a distance. The partitioning element 48 has a height and/or extends or substantially extends between the fuel support elements 32*a*,32*b*, more preferably over at least a majority of the said distance, although less than half the distance may be envisioned. As shown, the partitioning element 48 extends all the said distance. The partitioning element 48 may, optionally, have a second, structural function of supporting and/or spacing apart the bed bases 14*a*,14*b* and/or the fuel support elements 32*a*,32*b* thereof from each other. The first and second functions may be of equal importance. Alternatively, the second function may be the primary function relative to the first function, or vice-versa. As such, the partitioning element 48 may also be referred to as a spacing element, a spacer or a dividing spacer screen. To fulfil this structural function, the or each partitioning element 48 may be formed at least in part of a rigid material, such as metals, plastics, glass or a combination thereof. Each partitioning element 48 comprises a plate or a sheet, positioned or positionable between the bed bases 14*a*,14*b*. To fulfil both functions, the partitioning element 48 is preferably rectangular or square in a front view and/or in cross-section. The partitioning element 48 extends along at least a major extent, and preferably the entire length or longitudinal extent of the electric fire apparatus 10. In other words, the partitioning element 48 may extend from a first said lateral wall 24*d* and/or side wall

28b to a second said lateral wall and/or side wall of the housing 12. The partitioning element 48 is preferably integrally formed with the fuel support element 32a,32b of one of or both the second and the first bed bases 14a,14b.

In the present embodiment, the partitioning element 48 is part of at least the second bed base 14b, and preferably also the first bed base 14a but could be instead be considered part of the housing, the lighting means or any other part of the electric fire apparatus. Furthermore, the or at least one said partitioning element 48 meets, connects or joins with the first and/or second bed bases 14a,14b at or adjacent to where the front bed base portion 36a,42a and the rear bed base portions 36b,42b meet. In the case of the first bed base 14a, the partitioning element 48 preferably connects to the fuel support element 32a at or adjacent to where the strip 44a and the front bed base portion 42a meet, preferably forward thereof. This enables light to travel through the transparent strip 44a and onto the mesh element 18 whilst the partitioning element 48 inhibits or prevents any light source of the lighting means 16 from being seen through the strip 44a.

At least one further or second partitioning element 48a is provided, as shown, but may be omitted. The or each second partitioning element 48a may be spaced-apart from, abuttable, connectable, connected or integrally formed with either or both bed bases 14a,14b, anywhere thereat. The second partitioning element or elements 48a may be associated with the rear bed base portions 36b,42b of either or both bed bases 14a,14b. Preferably an upper end of the or each second partitioning element 48a may be at, against or adjacent to the rear wall 24c, but this may be omitted.

The lighting means 16 in-use emits light and/or illuminates at least part of the electric fire apparatus 10. The lighting means 16 is at least partly positioned or contained within the grounding portion 22. The lighting means 16 may also be referred to as a lighting system or lighting arrangement. The lighting means 16 comprises at least one, and more preferably, four light sources 50. The or each light source 50 directs light towards or through either or both the front beds and rear beds but away from a bed base is an option. Preferably, the lighting means 16 does not illuminate the at least one mesh element 18 from above, although this additional or alternative feature may be envisioned. The lighting means 16 also comprises reflecting means 52, although this feature may be omitted.

Each light source 50, also referred to as a projection means or projector, preferably comprises one or more LEDs, although any other suitable type of light, such as incandescent lights or LCDs may be envisioned. The one or more LEDs may emit coloured and/or white light. The light source or sources 50 may even project an image, such as a flame and/or a film or looping video recording of fire. The light source 50 may comprise a strip or bar extending along some or all of the depth and/or longitudinal extent of the electric fire apparatus 10 to provide discontinuous or continuous light. One or more light sources 50 may alternatively or additional comprise a plurality of discrete LEDs, spaced apart along the depth and/or, here, the width of the electric fire apparatus 10. Each light source 50 may be oriented or orientable to shine light directly and/or indirectly, via the reflecting means 52 towards one or both bed bases 14. A direct light source may in-use provide the "fuel glow" or burning fuel effect by illuminating the imitation fuel 34a,34b and/or at least one mesh element 18 associated with the imitation fuel 34a,34b.

The reflecting means 52 reflects light from one or more light sources 50. The reflecting means 52 comprises at least one, and preferably six, reflective elements or surfaces 54. Four of the reflective elements 54 comprise at least one mirror, indicated as crosses in FIG. 1. First and second fixed mirrors 54a,54b may be provided in the grounding portion 22, which are angled or curved to provide maximum light projection up through the bed bases 14a,14b with no or minimal loss of light.

The first fixed mirror or reflector 54a may optionally meet with the front facing section 24b at a first angle and optionally with the ground-facing section 24a at a second angle. Similarly, the second fixed mirror or reflector 54b meets with the rear wall 24c at a third angle and with the ground-facing section 24a at a fourth angle, although these features are optional. As such, the first fixed mirror 54a is rearward facing. Any of the angles may be between 10° and 70°, and more preferably between 20° and 60°. Most preferably the first angle may be 40° and the second angle may be 50°. The third and fourth angles may be 45°. One or both the first and second fixed mirrors 54a,54b, together with the grounding portion 22 may define or provide a reflective light chamber 56 which preferably boxes in, surrounds or encloses at least one rotatable mirror 58, and here, both a front rotatable mirror 58a and a rear rotatable mirror 58b. Preferably, the front and/or rear rotatable mirrors 58a,58b may each have an axis of rotation which is in an in-use horizontal plane but this may be optional. The axes are preferably also in the same plane and/or spaced apart by the same distance from the ground-facing section 24a, but these feature may be omitted. The position of the first fixed mirror 54a is such that its upper end ends forwards of the front end of the bed bases 14a, 14b and/or the front screen 28c. The first fixed mirror 54a is also preferably provided below the front screen 28c and/or the second bed base 14b. Preferably, the upper end of the first fixed mirror 54a may be at or substantially at the same level or height as the front end of the first or second bed base 14a,14b. The upper end of the first fixed mirror 54a may preferably be above an upper end of the second fixed mirror 54b. The front and/or rear rotatable mirrors 58a,58b are preferably positioned below the respective upper ends of the first and second fixed mirrors 54a,54b. Furthermore, the front and/or rear rotatable mirrors 58a,58b are preferably positioned above the respective lower ends of the first and second fixed mirrors 54a,54b.

The reflective light chamber 56 may be partitioned into a front lighting chamber 60a and a rear lighting chamber 60b. The grounding portion 22 may even have to this effect a partition member 62. Said partition member 62 may or may not be reflective on one or both sides. As shown, the partition member 62 may extend along all or some of the distance between the ground-contacting or ground-facing section 24a of the grounding portion 22 and the first bed base 14a. This provides at least one passage 64 such that the front and rear lighting chambers 60a,60b are communicable or connected but this feature may be omitted.

The front rotatable mirror 58a, also referred to as a spindle or rotisserie, is provided as a rotating spindle having at least one, and here five, preferably multi-coloured, foil or mirror reflectors, fins or sections. The spindle 58a in-use rotates and its function is to reflect a beam of light of a said light source 50 up through the bed bases 14 and onto the or a said mesh element 18. This will give the visual impression of flickering moving flames.

Preferably each of the front and rear lighting chambers 60a,60b comprises at least one, and preferably two, said light sources 50 for directing light through the front and/or rear bed base portions 36a,36b,42a,42b of either or both bed bases 14a,14b. In the front lighting chamber 60a, preferably, one said front light source 50 is associated with, connected to or on the ground-facing section 24*a*. The said light source 50 may emit light directly towards to the bed bases. The other, frontmost, front light source 50 is spaced-apart from on the ground-facing section 24*a*, but this need not be the case. The said frontmost, light source 50 may be positioned below, at or substantially at the same level or height as, or just above, the front end of the first bed base 14*a*. Preferably, the frontmost light source 50 may be directed towards the front rotating spindle 58*a*. The light reflected by the front rotating spindle 58*a* may be reflected towards the bed bases and/or may be reflected by the first fixed mirror 54*a*. This will create a flame effect and/or a glowing ember effect within the bed bases 14.

An optional, mirrored strip or baffle 66, provided as a front reflection mirror strip or front reflector, is connected or connectable to the grounding portion 22. The baffle 66 may reflect light onto the or a said mesh element 18 and/or the bed bases from the front. The mirrored strip 66 may be planar, non-planar, curved, at least partly curved and/or as shown, the mirrored strip 66 extends in non-parallel and non-co-planar planes. In particular, the mirrored strip 66 comprises a major section or portion 67*a*, and, optionally, an inturned edge, shoulder or lip 67*b* connected thereto. One, both or neither of the major section 67*a* and the lip 67*b* may be mirrored and/or reflective on their respective rear-facing surface and/or their respective front-facing surface. Preferably, the mirrored strip 66 is only reflective on the rear-facing surface but either or both rear-facing and front-facing surfaces thereof could be reflective in an alternative embodiment. In a further alternative embodiment, neither the rear-facing surface nor the front-facing surface may be reflective. The mirrored strip 66, and in particular, the major section 67*a* thereof may be upstanding or extending in a preferably generally upwards direction from the front facing section or wall 24*b* and/or beyond the front end of the front bed base portion 36*a* of the second bed base 14*b*, but either feature may be omitted.

In the present embodiment, the front facing section 24*b* comprises a major front surface 69*a* and a small ledge 69*b* which is meets with the major front surface 69*a*, preferably perpendicularly, although non-perpendicularly may be envisioned. As shown, a third surface 69*c* meets both the small ledge 69*b* and the major front surface 69*a*, although the third surface and/or the small ledge may be omitted entirely. The third surface 69*c* and is preferably parallel with neither surface 69*a*,69*b*. Said third surface 69*c* may be parallel to the second fixed mirror 54*b*. The third surface 69*c* preferably meets the ledge 69*b* at an end or edge thereof and at an angle. Similarly, the third surface 69*c* meets with the major front surface 69*a* at an angle. Either angle may be between 10° and 70°, more preferably at 20° to 60° and most preferably is 45° as shown although any angle may be envisioned. The major portion 67*a* of the mirrored strip 66 may be connected or connectable with the ledge 69*b*, most preferably with the end edge thereof. Additionally or alternatively, the mirrored strip 66 may be connected or connectable with the third surface 69*c*. Furthermore, at least one of the front light sources 50 is connected to and/or oriented by the third surface 69*c*, preferably towards any of: the front spindle 58*a*, the other front light source 50, the second fixed mirror 54*b*, and the ground-facing section 24*a* but this is optional. The, each or at least one front light source associated with the third surface and/or any of the light sources may be omitted, however.

The lip or shoulder 67*b* extends from the major section 67*a* in a rearward direction, towards any of the ceiling 30*a*, the front screen 28*c*, the front end of either bed base 14, the back wall 26, the or a mesh element 18, a second mesh element 18*b*, or the back of the fire apparatus 10. The plane of the lip 67*b* may form an angle with the plane of the major section 67*a*, and the angle may be in the range of 0° to 90°, more preferably in the range of 10° to 60°. Most preferably, the angle is 45°. In other words, the plane of the lip 67*b* may be parallel with the second fixed mirror 54*b* and/or may be such as to direct light from the front rotatable mirror 58*a* into the bed bases 14. The mirrored strip 66 preferably ends above the front end of one or all bed bases 14.

Preferably, the mirrored strip 66 is spaced apart from the front screen 28*c* and/or from a front end of the or all bed bases 14. This provides a gap or channel 68 for light and/or an access to the reflective light chamber 56. The reflective chamber 56 is therefore not fully enclosed, although this alternative may be envisioned, in which case the chamber might be closed by a transparent section to permit light therethrough. The overall effect will be one of a glowing embers, with flames in and rising from the embers. It may be envisioned that the mirrored strip may be added to and/or connected to or abutted against a base of the front screen and/or the front end of a bed base. In other words, the gap may be substantially omitted or omitted entirely.

The gap 68 may be between 0.2 cm and 15 cm wide, more preferably between 0.2 cm and 5 cm. Most preferably, the narrowest portion or the neck of the gap is no more than 6 mm to prevent finger ingress.

Similarly, the rear or back lighting chamber 60*b* may comprise the second fixed mirror 54*b* and the said rear rotatable mirror 58*b*. The rear light source or sources 50 emits light which may be direct and/or reflected off at least one of the second fixed mirror 54*b* and the said rear rotatable mirror 58*b*, similarly to the front lighting chamber 60*a*. Detailed description of the common features and effects is omitted for brevity. Optionally, the rear lighting chamber 60*b* also comprises a rear mirrored strip 70, as shown.

The rear mirrored strip or baffle 70 connects to, extends or depends from the or the first bed base 14*a* towards the ground-facing section 24*a* and/or towards the partition member 62. The rear mirrored strip 70 is preferably vertical or substantially vertical but angled away therefrom may be envisioned, for orienting the light differently. Said angle may be between 10° and 50°, for example 30° or 45°. The rear mirrored strip 70 is preferably also beneath the partitioning element 48 and/or the strip 44*a*, more preferably forwards thereof. This relative position enables light from the rear lighting chamber 60*b* to be reflected upwards and/or into the bed bases, or at least helps direct light through the transparent strip 44*a*. Preferably, the rear mirrored strip 70 is only reflective on the rear-facing surface, but either or both the rear-facing and front-facing surfaces thereof could be reflective in an alternative embodiment. In a further alternative embodiment, neither surface of the rear mirrored strip may be reflective. A plurality of baffles 66, 70 may be provided.

Preferably, both light sources 50 of the rear lighting chamber 60*b* are spaced apart from the ground-facing section 24*a*. One said rear light source 50 is preferably directed towards the rear spindle 58*b* and one is preferably directed towards the bed bases 14 and/or the front but any alternative combination of arrangement, orientation and positioning may be envisioned. In particular, at least one rear light source 50 may be connectable or connected to the partitioning member 62, at or adjacent an upper end thereof, and preferably on a rear-facing surface thereof.

The partitioning member 62 comprises here a generally upstanding major portion and optionally, a lip, shoulder or ledge connectable or connected with the upstanding major portion. The ledge is preferably non co-planar and/or non-parallel with the upstanding major portion such that the ledge extends at an angle. Said angle may be between 10° and 70°, more preferably between 20° and 60° and most preferably, is 45°. Preferably, the plane of the ledge is parallel to the second fixed mirror 54*b* and/or the third surface 69*c*, but non-parallel is an option.

As previously mentioned, the or each mesh element 18 provides a substrate in the form of a mesh upon which light and/or an image from the lighting means 16 may be projected. The or a first said mesh element 18 in-use provides a holographic flame or simulated flame effect. As such, said mesh element 18 may be referred to as a first mesh element, a first holographic mesh element, a primary illusion screen, a flame mesh, a screen or a curtain 18*a*. A curtain 18*a* is defined as a fabric which may be foldable and/or non-rigid and which is connectable to a support from which the curtain hangs. A curtain is considered to be a subset of a screen, which includes rigid as well as non-rigid occlusion means.

The or each mesh element 18 is preferably pliable, bendable and/or foldable but may alternatively be at least partially rigid. The mesh element 18 may even be coloured. Once in position and/or in-use, the mesh element 18 becomes invisible or substantially invisible. The or each mesh element 18 may be formed of metal, plastics, glass, fibreglass or a combination thereof. In the present embodiment, the or each mesh element 18 comprises an underlying structure and a coating applied to the underlying mesh structure. Preferably, the underlying structure comprises strands of plastics, such as polyamide, polyester, or nylon, or any other suitable material. The strands are woven together to form a fabric, lattice or fine mesh, similar to that of gauze or lace. As such, the underlying structure may be referred to as "gauze". The coating may be selected to be durably shiny and/or reflective. Preferably, the coating is as transparent or translucent as possible. The or each mesh element 18 may be partially or fully transparent, or semi-translucent.

In the present embodiment, the or each mesh element 18 is between 50% and 90% transparent, and more preferably between 60% and 80% transparent. Most preferably, the mesh element is 78% transparent. This enables the or each mesh element 18 to be or be substantially invisible in-use, particularly if the or each mesh element 18 is against a dark or black backdrop. The coating may comprise metals, such as silver, sliver fibre optics material, aluminium, any other suitable material, or any combination of the above. Preferably, the coating comprises an alloy. Most preferably, the mesh element 18 comprises polyamide and silver, such as silver fibre optics. The percentage of polyamide by weight or by volume may be between 60% and 99%, more preferably between 90% and 95%, and most preferably 94%. The percentage of silver fibre optics by weight or by volume may be between 40% and 1%, more preferably between 10% and 5%, and may be most preferably 6%. The degree of transparency of the or each mesh element 18 constitutes a trade-off. A more transparent mesh is less visible in-use, however, the image projected is dimmer or less bright. The screen gain may be up to 10.0, and is more preferably between 2.0 and 3.0. The viewing angle provided may be up to 180°. When exposed to low frequency soundwaves, the mesh element 18 may have no or substantially no vibrations. The approximate weight per meter-square or $m^2$ may be between 5 grams and 50 grams, more preferably between 10 grams and 20 grams and most preferably is 17 grams. The style of mesh may be eyelid. The mesh element 18 may have flame retardant properties and/or be treated to have such properties. In particular, the mesh element 18 may comply with the DIN 4102 B1 standard. The mesh element 18 may have good 3D polarisation performance. As such, the or each mesh element 18 may be referred to as a metallic mesh, a metallic gauze, a metallicized mesh or gauze, or a Holographic Gauze Mesh. An example of a suitable mesh element 18 may be the Holoflex or Holo-Gauze Material as manufactured by Glimm Screens B. V, based in Amsterdam, The Netherlands.

As comprising a mesh, the or each mesh element 18 is porous or has a plurality of small holes, gaps, apertures or pores which enables light therethrough. Preferably, the mesh element 18 may comprise a pore density between 2 pores and 100 pores per centimetre, more preferably between 5 pores and 50 pores per centimetre. In the preferred embodiment, the mesh element 18 has a pore density of about 10 pores per centimetre. Said pores also enable air therethrough such that a greater amount of air reaches the heating element 20 through the mesh, compared to screen of a solid material. As a result, the airflow to the heating element 20 is less restricted, and a more powerful heating element 20 may be used. Also, the airflow through the pores means the heating element 20 is less likely to drag the mesh element 18 towards the back wall 26, towards the ceiling 30*a* and/or towards the base or grounding portion 22 via suction.

The first mesh element 18*a* is held, preferably taut, along at least two, preferably three, or most preferably along all four edges of the mesh element 18*a*. The first mesh element 18*a* is supported by the housing 12, in particular by being engageable with the ceiling 30*a* of the top portion 28*a*, for example by hanging therefrom and/or by being connected to the side walls of the housing 12, whether directly or indirectly by means of a frame. The first mesh element 18*a* extends from the second bed base 14*b*, between the front bed base portions 36*a*,42*a* and rear bed base portions 36*b*,42*b* of the second bed base 14*b* and/or the first bed base 14*a*. The first mesh element 18*a* preferably engages with and/or connects with the second bed base 14*b* but it may be envisioned that a lower end of the first mesh element may instead be vertically spaced apart from the second bed base. As such, the holographic first mesh element 18*a* may be considered to divide the, either or all bed bases 14*a*, 14*b* into a front bed base portion 36*a*,42*a* and a rear bed base portion 36*b*,42*b*. Preferably, the first mesh element 18*a* is spaced-apart from the front screen 28*c*. Additionally, the first mesh element 18*a* is preferably spaced-apart from the back wall 26. The holographic effect of the first mesh element 18*a* requires that the mesh element 18*a* is at least partly spaced-apart from a suitable background, which is here the back wall 26 of the electric fire apparatus 10.

The first mesh element 18*a* or at least a major portion thereof, is preferably in a taut condition and/or is extended in a plane, at least when in use. Preferably, the electric fire apparatus 10 comprises only one planar first mesh element 18*a* but a plurality may be envisioned. As shown, the first mesh element 18*a* is preferably angled relative to a vertical plane. The first mesh element 18*a* is preferably non-parallel with the back wall 26 and/or the mesh plane extends non-perpendicularly to the first and/or second bed bases 14. The first mesh element 18*a* may be angled towards the back as shown, although forwards, or being vertical or substantially vertical may be envisioned. This may depend on the dimensions of the fireplace cavity and/or the electric fire apparatus. The angle between the first mesh element 18*a* and either or both bed bases 14 may be small, such as between 5° and 40° and more preferably between 10° and 30°. The strip 44*a* is preferably positioned beneath and/or rearward relative to the mesh element 18*a*.

Alternatively to, or preferably, in addition to the above first mesh element 18*a*, the electric fire apparatus 10 may comprise at least one further mesh element 18 which is associated with the bed bases 14 and/or the imitation fuel 34*a*,34*b* or fuel support element 32*a*,32*b*. For clarity, such a mesh element 18 may be referred to as a second mesh element, a fuel mesh or fuel mesh element 18*b*, and is indicated as dashed lines in FIG. 1. The or each second mesh element 18*b* may be draped, laid over, wrapped around and/or positioned between and/or beneath at least one imitation fuel element 38*a*,38*b*. 3D relief and/or additional layers of depth to the holographic effect are provided, thereby improving the realism of the fire, flame or burning fuel effect. Each second mesh element 18*b* is associated with the front bed base portion 36*a*,42*a* and/or rear bed base portion 36*b*,42*b* of either, each, or both of the first and second bed bases 14*a*,14*b*. As shown, a second mesh element 18*b* is draped over the upper front bed base portion 36*a* and one or more second mesh elements 18*b* are draped over the front bed base portions 42*a*, the rear bed base portions 42*b*, or both portions 42*a*,42*b* of the first bed base 14*a*. There may be more than one second mesh element associated with any one portion.

In-use, the user would obtain an electric fire apparatus 10. Whilst the electric fire apparatus 10 may already be fully assembled, the electric fire apparatus 10 may be provided in a kit of parts which may be at least partly assembled or in a fully disassembled state or deconstructed condition. In these cases, the user may need to assemble the electric fire apparatus 10 according to some or all the following steps, prior to use. The bed bases may not necessarily be stacked or positioned one above the other at this stage.

A receiving area or cavity is prepared to receive the electric fire apparatus 10. The user inserts and appropriately positions the housing 12 in the receiving cavity. This step may be done at any time of the assembly process, including at the end. However, at or towards the beginning of the assembly is preferred, as the housing 12 is lighter to carry and move relative to when assembled. Additionally, this reduces the risk of movement and/or damage to any of the components. The grounding portion 22 is positioned in place, with the back wall 26 and/or rear wall 24*c* facing, abutting or at least closest to the depth of the receiving cavity. If detachably connectable therefrom and if desired, the back wall 26 and side walls 28*b* may be connected to the rear wall 24*c* and lateral sections 24*d* at this point or at any point up until installation of the first mesh element 18*a*. The front of the electric fire apparatus 10 is closest to the user.

If not already done, the lighting means 16 is installed. This may involve inserting, and/or fixing the at least one, and preferably all the reflective elements 54 in position. Similarly, the or all light sources 50 are positioned and/or oriented appropriately.

The or at least one bed base 14 is positioned above the lighting means 16. This may be done by sliding, pivoting and/or lowering the or at least the first bed base 14*a* and/or the fuel support element 32*a* into or onto one or a plurality of support elements, such as brackets, battens, stilts or other such support elements, connectable or connected to the housing 12.

If not already done prior to insertion, the imitation fuel 34*a* is made to overlie, be superposed, superimposed, or arranged onto the fuel support element 32*a*. This involves positioning each fuel element 38*a* on, above and/or around each log-shaped transparent portion 44*b*, with the outer face 40*c* of the or each fuel element 38*a* visible to the user. The or each second mesh element 18*b* may be positioned in, on, around, under or any combination thereof around the imitation fuel 34*a*, whether loosely draped and/or tightly fitting around each fuel element 38*a*.

If the second bed base 14*b* is separable from the first bed base 14*a*, and/or if provided with a further bed base 14 which may be a second bed base 14*b*, for example, such that there are three bed bases, the user lowers and/or slides or pivots the further second bed base 14*b* into position, above the or all bed bases 14 already in position. Although an upper fuel support element may be laid straight onto the imitation fuel of a bed base positioned below, preferably, the partitioning element 48 spaces apart a bed base from the one below. There may be additional supports and/or partitioning elements, to support the second bed base 14*b*, similar to the first bed base 14*a*. The imitation fuel 34*b* is laid on top of the fuel support element 32*b*. The or each fuel mesh element 18*b* is inserted, similarly to the first bed base 14*a*.

As the partitioning element 48 is preferably integrally formed with both and/or all bed bases 14*a*,14*b* in the present embodiment, all bed bases 14*a*,14*b* are inserted into the housing 12 simultaneously, and preferably after imitation fuel 34*a* has been positioned on at least the lower fuel support element or elements 32*a* and/or after the fuel mesh elements 38*b* have been positioned.

The user finishes the assembly by installing the first mesh element 18*a* which may require assembly of the rest of the housing 12 if not already done. The pliable first mesh element 18*a* may be unfolded, unfurled or unrolled if in a folded, furled or rolled condition. The first mesh element 18*a* is then connected to the ceiling 30*a* and/or to the side walls 28*b* and may be extended into a planar or substantially planar condition. The heating element or heater 20, if provided, is connected to, or preferably contained within the housing 12, more preferably within the top portion 28*a* thereof, although the or a further said heating element may be found or insertable in other locations, such as beneath, behind, or to a side of the housing.

If provided, the front screen 28*c* may be connected to the housing 12 before or after the heating element 20 is installed. Preferably, a lower end of the front screen 28*c* is made to sit upon, abut against or engage with a front end of the first and/or here, second bed base 14*a*,14*b*. An upper of the front screen 28*c* may engage with the housing 12, preferably rearwards of the exit 31*b* the heating element 20 and/or forwards of first mesh element 18*a*.

The electric fire apparatus 10 in the assembled condition is ready for use. The user, upon wanting to see a simulated fire effect, turns the fire apparatus 10 on.

The lighting means 16 is also turned on to illuminate the imitation fuel 34*a*,34*b* and/or the or a said mesh element 18 from below. The transparent portions 44*b* increase the amount of light that reach the imitation fuel 34*a* above. In other words, the transparent portion or portions 44*b* enable an amount of light through the or each further transparent portion 44*b* to reach the or each fuel element 38*a*, said amount of light being greater than the amount of light permitted by the or each translucent portion 46. The illuminated lower fuel elements 38*a* may in turn illuminate the second bed base 14*b*. The translucent portion or portions 46 enable some light therethrough whilst hiding more or all of the lighting means 16 below.

The light sources 50 emit light to provide the burning fuel effect and/or the flame effect. The flickering flames may be provided by light reflecting off the rotatable mirrors which are in rotation around their spindle in-use. The angular velocity may be at a constant and/or variable. The non-rotating mirrors reflect any light towards the imitation fuel 34*b*, 34*a*, increasing the amount of light in the bed bases 14 receive. The strip 44*a* in particular enables light from a direct light source 50 and/or reflected off one or more reflective elements 54 to illuminate the first mesh element 18*a*, preferably from the rear. Preferably, the first mesh element 18*a* is only illuminated by light from the rear lighting chamber 60*b*, but front lighting may additionally or alternatively be envisioned. Most preferably, the light source 50 associated with the partition member 62 emits light which is reflected by the rear rotatable mirror 58*b* and/or the second fixed mirror 54*b*, through the strip 44*a* and onto at least the first mesh element 18*a*. Optionally, some of the light may additionally be reflected by the rear mirrored strip 70 and/or onto the rear second mesh element 18*b*. The heating element 20 emits heat and/or blows heat and/or heated air out through the exit 31*b*.

In summary, there is provided a method of providing an improved simulated fire effect, by providing an electric fire apparatus 10; and shining light through the or all bed bases 14. There is also provided a method of providing an improved simulated fire effect, by dividing a bed base 14 using a holographic mesh element 18.

Figure 3:
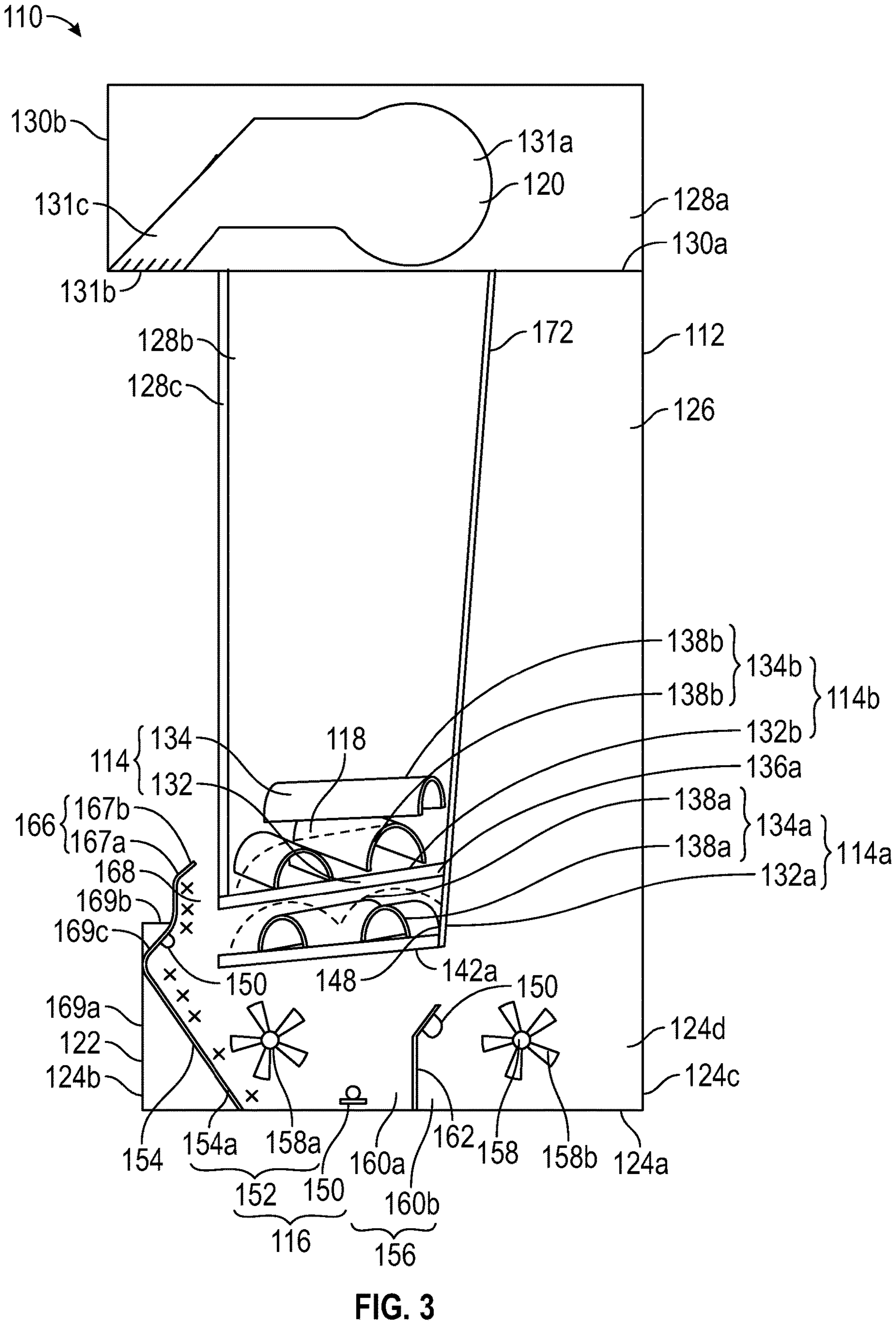
FIG. 3 shows a cut away side view of a second embodiment of an electric fire apparatus in accordance with the fourth aspect of the invention.

Referring now to FIG. 3, there is shown a second embodiment of an electric fire apparatus 110. Features of the second embodiment of the electric fire apparatus 110 which are similar to the first embodiment of the electric fire apparatus 10 have similar reference numerals, with the prefix "1" added.

The electric fire apparatus 110 is similar to the electric fire apparatus 10 of the first embodiment, comprising a housing or housing element 112; at least one, and more preferably, two bed bases 114; and a lighting means 116 having at least one light source 150; at least one holographic mesh element 118, and a heating element 120 although any of these features may be omitted. Detailed description of the common features is omitted for brevity.

The or each mesh element 118 of the second embodiment is similar to the mesh element 18 of the first embodiment. Detailed description of the common features is omitted for brevity. Preferably, unlike in the first embodiment, the electric fire apparatus 110 of the second embodiment does not comprise a first mesh element, in other words, the mesh element which extends from between the front and rear bed base portions and/or which is taut is omitted. Instead, the or each mesh elements 118 is similar to a second mesh element 18*b* of the first embodiment. Detailed description of the common features is, again, omitted for brevity. Instead of a first mesh element, the electric fire apparatus 110 may comprise a, preferably meshless, screen 172. The screen 172 is preferably at least partly semi-translucent or semi-transparent, and may have various levels or degrees of transparency and/or reflectiveness. The screen 172 may be coloured but non-coloured is an option. The screen 172 is preferably fitted at a rear of the bed base 124. The screen 172 may be angled towards the front, or the rear, or be vertical. The screen 172 may be formed of glass, plastics, such as acrylics, metals or any combination thereof.

The housing 112 is similar to the housing of the first embodiment, having a ground or grounding portion 122 comprising a ground-facing section 124*a*, a front facing section 124*b* comprising a major front surface 169*a*, a small ledge 169*b* and a third surface 169*c*; and a rear section 124*c* and optional one or more lateral walls 124*d*; a back wall 126; a top portion 128*a*; two side walls 128*b*; a front screen 128*c*; a ceiling 130*a*; a front surface 130*b*; a chamber 131*a*; a further exit 131*b*; a channel 131*c*, although any of the above may be omitted. Detailed description of the common features is therefore omitted for brevity.

Each bed base 114 of the second embodiment is similar to a bed base 14 of the first embodiment, comprising a fuel support element 132 and imitation fuel 134, although any one of the features may be omitted. There are preferably two bed bases 114 such that there is a first bed base 114*a* and a second bed base 114*b*. The first bed base 114*a* is similar to the first bed base 14*a* of the first embodiment, comprising a fuel support element 132*a* and imitation fuel 134*a* comprising one or more imitation fuel elements 138*a*. The second bed base 114*b* is similar to the second bed base 14*b* of the first embodiment, comprising a fuel support element 132*b* and imitation fuel 134*b* comprising at least one, and preferably a plurality of imitation fuel elements 138*b*. Detailed description of the common features is omitted for brevity.

Unlike the first embodiment, at least one of, and preferably both the first and second bed bases 114*a*, 114*b* only comprise a front bed base portion 136*a*, 142*a*. In other words, the rear bed base portion is omitted in either or both the first and second bed base 114*a*, 114*b*. The fuel support elements 132*a*, 132*b* may therefore respectively comprise the front bed base portion 132*a*, 142*a* only. In the second embodiment, the front bed base portion 36*a* is defined as the portion of the bed base 14*b* which is in front of the screen 172.

The front bed base portion 136*a* of the second bed base 114*b* is similar to the front bed base portion 36*a* of the first embodiment. The front bed base portion 142*a* of the first bed base 114*a* is similar to the front bed base portion 42*a* of the first embodiment, having at least one transparent portion and at least one translucent portion. The or at least one said transparent portion of the second embodiment is or are similar to a further transparent portion 44*b* of the first embodiment. Detailed description of the common features is once again omitted for brevity. Preferably, the first bed base 114*a* does not comprise an elongate and/or strip-shaped transparent portion. In other words, in the second embodiment, the strip is preferably omitted from the first bed base 114*a*.

The electric fire apparatus 110 further comprises at least one partitioning element 148, but this feature may be omitted and/or may be part of the screen. The or each partitioning element 148 is similar to the partitioning element 48 of the first embodiment. Detailed description of the common features is omitted for brevity.

The lighting means 116 of the second embodiment is similar to the lighting means 16 of the first embodiment, having similar at least one light source 150, and reflecting means 152 having at least one reflective element or surface 154. The reflecting means 152 comprises a first fixed mirror 154*a*, at least one rotatable mirror 158, and here, both a front rotatable mirror 158*a* and a rear rotatable mirror 158*b*. The first fixed mirror 154*a* together with the grounding portion 122 define a reflective light chamber 156, preferably delimitated into a front lighting chamber 160*a* and a rear lighting chamber 160*b* by a partition member 162, similarly to the first embodiment. Detailed description of the common features is omitted for brevity. Unlike the first embodiment, the reflecting means 152 of the second embodiment preferably does not comprise a second fixed mirror. The front and/or rear rotatable mirrors 158*a*, 158*b* are preferably positioned below the upper end of the first fixed mirror 154*a*. Furthermore, the front and/or rear rotatable mirrors 158*a*, 158*b* are preferably positioned above the lower end of the first fixed mirror 154*a*.

In the second embodiment, the lighting means 116 preferably comprises three lighting sources 150 rather than four. In particular, the rear lighting chamber **160*b* may comprise one light source 150 instead of two or more, but these alternatives could be envisioned. Preferably, the light source omitted relative to the first embodiment is the light source directed towards the bed bases 114 and/or the front and/or associated with the rear wall 124*c*, but this need not be the case or the opposite may be envisioned. Thus the rear lighting chamber 160*b* comprises at least a rear light source 150 which may be connectable or connected to the partitioning member 162**, at or adjacent an upper end thereof, and preferably on a rear-facing surface thereof.

The mirrored strip 166 of the second embodiment is similar to the mirrored strip of the first embodiment, having a major section or portion **167*a*, and optional lip 167*b* connected thereto. Preferably, the mirrored strip 166 is spaced apart from the front screen 128*c* and/or from a front end of the or all bed bases 114 to provide a gap 168, similarly to the first embodiment. Detailed description of the common features is omitted for brevity. Preferably, the rear lighting chamber 60*b*** does not comprise a rear mirrored strip, unlike the first embodiment, but this may be envisioned in an alternative embodiment.

As there is preferably no rear bed base portion in the second embodiment, each or a said mesh element 118 is associated with the front bed base portion **136*a*, 142*a* of either, each or both of the upper and lower bed bases 114*a*, 114*b***.

The uses of the second embodiment are similar to those of the first embodiment. Detailed description of the common steps is omitted for brevity.

Instead of installing a first mesh element, the user installs the screen 172. This may involve engaging the screen 172 with the bed bases 114 and/or the housing 112. Preferably the lower end of the screen 172 is seated on or engaged with the first or second bed base **114*a*, 114*b*. An upper end of the screen 172 may engage or rest against the housing 112, in particular the back wall 126, and/or may abut against a stop or abutment element and/or may be received within a groove or slot. The slot and/or abutment element may be positioned on or extending from any of: the ceiling 130, one or more lateral walls 124*d*, and one or more side walls 128*b*. Additionally or alternatively, fastening means may be provided. Light may be projected onto the in-use screen 172** from the front and/or the back.

Figure 4:
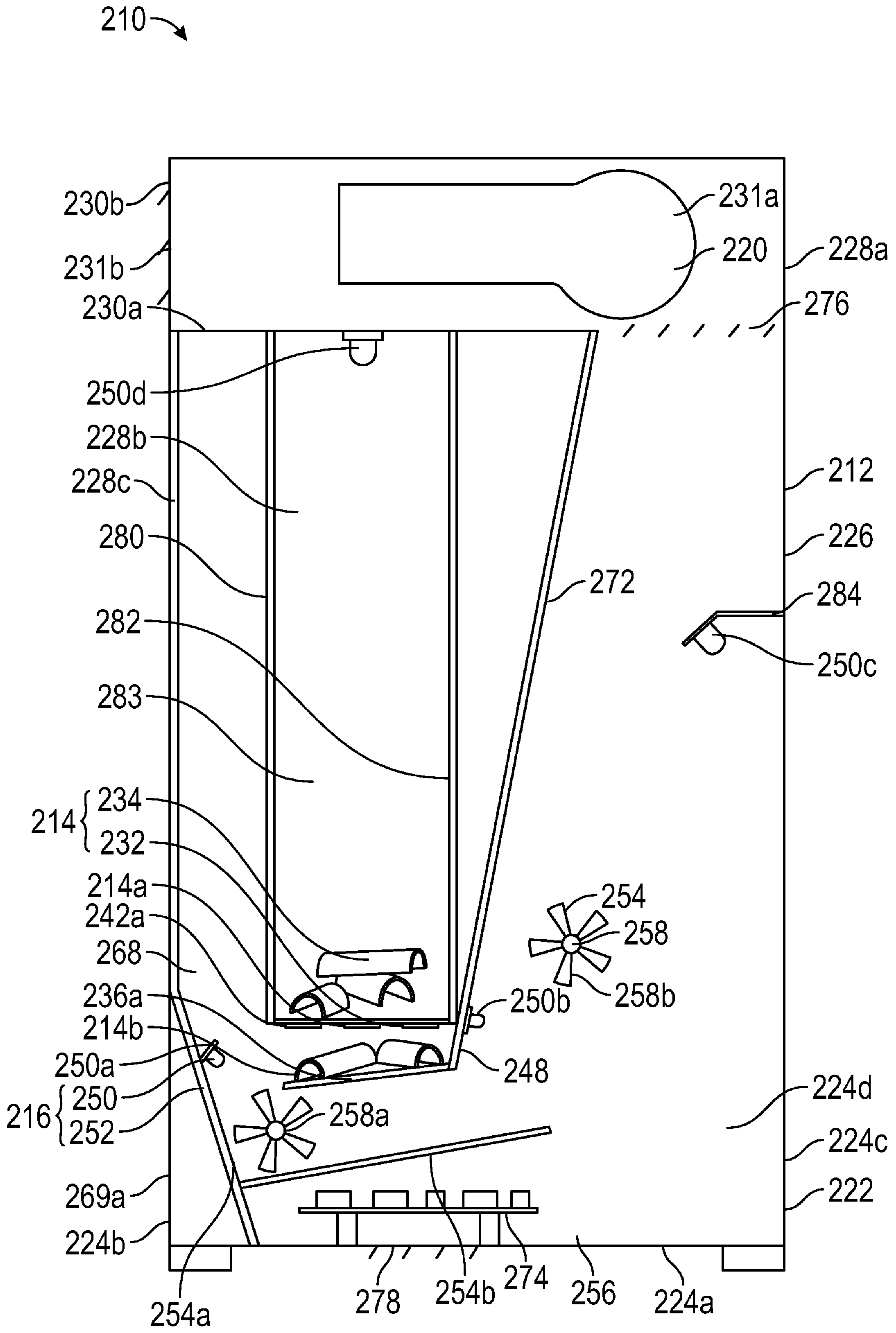
FIG. 4 shows a cut away side view of a third embodiment of an electric fire apparatus in accordance with the fourth aspect of the invention.

Referring now to FIG. 4, there is shown a third embodiment of an electric fire apparatus 210. Features of the third embodiment of the electric fire apparatus 210 which are similar to the first embodiment of the electric fire apparatus 10 or the second embodiment of the electric fire apparatus 110 have similar reference numerals, with the prefix "2" added if no previous prefix was added, or replacing the previous prefix.

The electric fire apparatus 210 is similar to the electric fire apparatus 10 of the first embodiment, comprising a housing 212; at least one, and more preferably, two bed bases 214; and a lighting means 216 having at least one light source; at least one screen 272, similarly to the screen 172 of the second embodiment; at least one electrical control component 274 and a heating element 220 although any of these features may be omitted. Detailed description of the common features is omitted for brevity. Unlike in the first and second embodiments, the electric fire apparatus 210 preferably does not comprise one or more mesh elements, whether first or second mesh elements, however it may be envisioned that the electric fire apparatus may alternatively comprise one or more first mesh elements and/or one or more second mesh elements.

The housing 212 is similar to the housing 12 of the first embodiment, having a grounding portion 222 comprising a ground-facing section **224*a*, a front facing section or wall 224*b* comprising a major front surface 269*a*; and a rear wall 224*c* and optional one or more lateral walls 224*d*; a back wall 226; a top portion 228*a*; two side walls 228*b*; a front screen 228*c*; a ceiling 230*a*; a front surface 230*b*; a chamber 231*a*; a further opening 231*b*; a channel connecting the chamber 231*a* to the exit 231*b*; and at least one ventilation inlet 276 although any of the above may be omitted. Detailed description of the common features is once again, omitted for brevity. There may be at least one further ventilation port 278 which may be associated with any part of the housing 212, and here is shown to be in the ground-facing section 224*a*. The ground-facing section 224*a*** in the third embodiment is preferably spaced-apart from the ground in use, by a spacing means, such as legs or supports. Furthermore, there is no small ledge and/or no third surface in the third embodiment but either or both features could easily be inserted.

Each bed base 214 of the third embodiment is similar to a bed base 14 of the first embodiment, comprising a fuel support element 232 and imitation fuel 234, although any one of the features may be omitted. There are preferably two bed bases 214 such that there is a first bed base **214*a* and a second bed base 214*b*. The first bed base 214*a* is similar to the first bed base 114*a* of the second embodiment, comprising only a front bed base portion 242*a*; and the second bed base 214*b* is similar to the second bed base 114*b* of the second embodiment, comprising only a front bed base portion 236*a*. Detailed description of the common features is omitted for brevity. As shown, the first bed base 214*a* is positioned preferably above the second bed base 214*b* in the third embodiment but the opposite may easily be envisioned. The first bed base 214*a* may be sloping or, preferably as shown, horizontal or substantially horizontal. Additionally the second bed base 214*b* is sloping. Preferably, said sloping is upward in a front to back direction, but downward or horizontal are alternative options. Preferably, the first bed base 214*a* does not comprise an elongate and/or strip-shaped transparent portion. The strip may be omitted from the first bed base 214*a***.

The electric fire apparatus 210 further comprises at least one partitioning element 248, but this feature may be omitted and/or may be part of the screen. The or each partitioning element 248 is similar to the partitioning element 48 of the first embodiment. Detailed description of the common features is omitted for brevity.

A projection screen 280 may be provided, which may be formed as a 3D holographic rear projection screen, such as a polyethylene terephthalate (PET) nanoparticle 3D holographic rear projection screen and/or may comprise a holographic mesh. Here, the term rear projection screen refers to the fact that the holographic projection is on a rear side of the screen with respect to a front of the electric fire apparatus 210. The projection screen 280 sits upon and/or is attached to a bed base 214, preferably the upper of the bed bases 214 and/or from a front end thereof. The screen 280 may project upwards towards the top of the appliance 210. The projection screen 280 may be or be substantially vertical as shown but angled forward or rearward are options.

A third, at least in part reflective screen 282, such as a two-way mirror or beam-splitter, may be provided which adjoins the screen 272 at a level of the, preferably upper, bed base 214. The at least in part reflective screen 282 is preferably vertical but may be angled forwards or rearwards. Between the projection screen 280 and the reflective screen 280 is defined a main fire box area 283 in which the display fuel or fuel bed is situated. If provided, the front screen 228*c* is preferably spaced-apart from the projection screen 280. However any of the screens may be omitted.

The lighting means 216 of the third embodiment is similar to the lighting means 16 of the first embodiment, having similar at least one light source 250 and reflecting means 252 having at least one reflective element 254. The reflecting means 252 comprises a first fixed mirror 254*a*, at least one rotatable mirror 258, and here, both front and rear rotatable mirrors 258*a*,258*b*. The first fixed mirror 254*a* together with the grounding portion 222 define or provide a reflective light chamber 256. Detailed description of the common features is omitted for brevity. The reflective light chamber 256 may even comprise the space between the back wall 226 and the screen 272. There is preferably no partition member, nor any front or rear light chambers in the third embodiment, but any of these features could easily be inserted Furthermore, the reflecting means 252 of the third embodiment also comprises a second fixed mirror 254*b*. However, a, preferably lower, end of the second fixed mirror 254*b* may be adjacent to, abut against, connectable with or be engaged with the first fixed mirror 254*a*, preferably at an angle. Said end may be forward and/or higher relative to the lower end of the first fixed mirror 254*a*. Said end may also or alternatively be rearward and/or lower relative to an upper end of the first fixed mirror 254*a*. Optionally, the second fixed mirror 254*b* may slope upwards in a front to back direction, but horizontal or downwards may be envisioned. The end is preferably spaced-apart from the ground-facing section 224*a*. The opposing end of the second fixed mirror 254*b* is preferably spaced-apart from the rear wall 224*c* and/or the ground-facing section 224*a*. Furthermore, the opposing end of the second fixed mirror 254*b* may be beneath or forwards of the rear rotatable mirror 258*b* and/or forward of an upper end of the screen 272. The opposing end may be rearward of the bed bases 214 and/or a lower end of the screen 272. The opposing end may be higher than, lower than or, here, level with one or both rotatable mirrors 258*a*,258*b*. The electric control components 274 is or are preferably positioned between the second fixed mirror 258*b* and the ground-facing section 224*a*. An upper end of the first fixed mirror 258*a* is preferably above the front end of the first and/or second bed bases 214*a*,214*b*. The front and/or rear rotatable mirrors 258*a*,258*b* are preferably positioned above the lower end of the first fixed mirror 254*a*. Furthermore, the front rotatable mirror 258*a* is preferably positioned below the upper end of the first fixed mirror 254*a*. However, the rear rotatable mirror 258*b* is preferably positioned above the upper end of the first fixed mirror 254*a* and/or of one or all bed bases 214.

In the third embodiment, the lighting means 216 preferably comprises at least one, and here four lighting sources 250, but any may be omitted. The first said lighting source 250*a* is on, at or adjacent the first fixed mirror 254*a*, optionally spaced-apart from an upper end thereof. The first source 250*a* may be rearward facing and/or directed towards any of: a said bed base 214, the second fixed mirror 254*b*, and, preferably, the front rotatable mirror 258*a*. The second said lighting source 250*b* is on, at or adjacent to the screen 272 and/or the rear end of a said bed base 214, preferably the upper of the bed bases 214. Said second lighting source 250*b* may be directed forwards or rearwards. Here, it may be oriented towards any of the rear wall 224*c*, the back wall 226 and the rear rotatable mirror 258*b*. The rear wall 224*c* and/or the back wall 226 may be reflective. The third lighting source 250*c* is preferably positioned between the upper and lower ends of the screen 272 and/or above the rear rotatable mirror 258*b*. Furthermore, the third lighting source 250*c* may be positioned rearward of the screen 272. Preferably, the third lighting source 250*c* is directed towards the grounding portion 222 and/or the back wall 226, and, optionally, may be spaced-apart therefrom by a spacing member 284. The fourth said lighting source 250*d* is preferably positioned above the bed bases 214 and/or may be in, on, at or adjacent to the ceiling 230*a*. The fourth source 250*d* may be directed downward and/or toward the bed bases 214 and/or toward the screen 272. The source 250*d* may be positioned between the third screen 282 and the projection screen 280. Preferably one or both mirrored strips are omitted from the third embodiment but either or both could be envisioned. The bed bases 214 and/or the projection screen 280 or at least a lower end thereof is spaced-apart, in a preferably rearward direction relative to the upper end of the first fixed mirror 254*a*. This provides a gap or channel 268, similarly to the first embodiment. Detailed description of the common features is omitted for brevity.

The uses of the third embodiment are similar to those of the first embodiment. Detailed description of the common steps is therefore omitted for brevity. Instead of installing a first mesh element, the user installs the screens 272,280,282, instead. This may involve engaging in turn each screen with the bed bases 214 and/or the housing 212. Preferably the lower end of the screen 272 is connected to, abutted against, or seated on the first or second bed base 214*a*,214*b*. An upper end of the screens may engage or rest against the housing 212, in particular the back wall 226, and/or may abut against stop or abutment elements and/or may be received within a groove or slot if provided. The slot and/or abutment element may be positioned on or extending from any of: the ceiling 230, one or more lateral walls 224*d*, and one or more side walls 228*b*. Additionally or alternatively, fastening means may be provided for a more secure fit. The front screen 228*c* may optionally be installed.

Any of the above modifications may be applicable to any of the embodiments. Similarly, the following modifications may be applicable to any of the above described embodiments.

The electric fire apparatus may comprise at least one screen in addition to or instead of a first mesh element. The electric fire apparatus and/or the screen may be meshless. Alternatively, the electric fire apparatus may comprise at least one holographic mesh element. Furthermore, at least one of the first bed base and the second bed base may comprise the or a said holographic mesh element. Preferably, the electric fire apparatus may comprise a screen. The screen may be meshless. The screen may be at least partly reflective. The screen may comprise acrylics. The screen may be at least partly translucent. Each bed base may comprise a fuel support element. Either, any or each fuel support element may comprise any of: a front bed base portion; a rear bed base portion; a front bed base portion and a rear bed base portion. In other words, any or all of the fuel support elements may only comprise a front bed base portion or a rear bed base portion. The screen may be at or adjacent to a rear end of the front bed base portion of the first bed base and/or a rear end of the front bed base portion of the second bed base. The screen may be rear-lit or back-lit. The electric fire apparatus, or at least one or a plurality of bed bases may be retrofittable to an existing fireplace and/or to an existing electric fire apparatus. The electric fire apparatus may additionally or alternatively comprise at least one second mesh element.

Although not shown, in any of the above embodiments, a front plate, front guard or fascia may be fitted, for safety or aesthetic purposes. The fascia may be fitted to the front of the electric fire apparatus, most preferably to the grounding portion thereof. The front facing section or wall may even be omitted. The fascia may comprise glass, plastics, metals, such as gold, silver, steel, stainless steel, or any other suitable material or combination of materials. The fascia may be curved, non-curved, linear, polygonal such as triangular or rectangular in any of: a longitudinal cross-section, a lateral cross-section, and a cross-section along the height. Preferably the fascia may be an arc in longitudinal cross-section. In other words, the fascia may be a section of a cylinder. Either or all fuel support elements may even be complementarily shaped with the fascia, for example to minimise or span the gap between the grounding portion and the front end of the bed bases. In this case, the or each fuel support element may have a curved front edge instead of a linear front edge.

In all the above embodiments, preferably the whole housing and/or the ground portion is or is substantially a square or a rectangle when viewed from the front. Similarly, the fuel support elements are square or preferably rectangular, as are the or each mesh element or screen. However, any of the housing, the grounding portion, any mesh element, any screen and any fuel support element may be an alternative shape, such as a non-curved, curved, partly curved, circular, oval, polygonal such as triangular, hexagonal, octagonal, trapezium, trapezoid or any other polygon, regular or irregular, or any combination thereof. The housing may be or be substantially rectangular with one or both edges, where the side walls meet the ceiling being curved or chamfered. The mesh element and/or the or each screen may have at least one curved edge and/or at least one linear or non-curved edge.

Whilst comprising the whole housing here, as an alternative in any embodiment, the electric fire apparatus can be fitted into a cavity or fireplace with part or all of the housing omitted. In this case, the first mesh element, if provided, may need to be provided with a frame and/or a supporting element such as a plate and/or be sufficiently rigid to remain in a planar or substantially planar condition. Additionally or instead, a semi-transparent or transparent main screen may be provided in addition to or instead of the first mesh element, to provide the simulated fire effect. For example, the first mesh element may be engaged with, connected to, such as via an adhesive or any other connection means, to a transparent plate or screen for structure, such as an acrylic plate. In other words, one or more mesh elements may be added or omitted from any of the above embodiments. Furthermore, one or more non-mesh screens or screen element may be added or omitted from any of the above embodiments. The housing, or at least the parts of the housing which are engageable with the grounding portion may be omitted entirely in this case. One or both bed bases may be retrofitted to an existing real or simulated fireplace having no or at least one bed base already. The first mesh element may be replaced by any previously mentioned screen. Any of the above screens may comprise a reflective coating and/or a reflective film. Said coating and/or film may be on one or both surfaces.

In any of the above embodiments, a mesh element may even be provided instead of or in addition to the partitioning element. Said mesh element may even be connected to the partitioning element, such as with an adhesive. Alternatively, a portion of a screen may act as the said partitioning element, such that the partitioning element may even be omitted. The upper bed base or bases may have a slit or gap enabling the first mesh element and/or a screen element to be inserted therethrough such that the first mesh element and/or screen element may extend between the first and second bed bases.

Whilst the or each mesh element comprises a coating applied to an underlying structure, it could be envisioned that the coating may be omitted. The underlying structure may be formed of or comprise the material of the coating instead. For example, the underlying structure may comprise metal strands or strands of fibre optics materials in a mesh or lattice. It may even be envisioned that instead of or in addition to a holographic mesh, the holographic effect may be provided by a screen comprising no mesh, such as formed by a solid substrate. The solid substrate may have particles suspended within and/or suitable to produce a hologram or holographic effect. An example of a solid, meshless screen may be an acrylics screen, or a glass screen. Such a screen is provided in the third embodiment but could be omitted or inserted in any of the above embodiments.

It could be envisioned that there may be a plurality of first bed bases and/or a plurality of second bed bases in any combination and arrangement. For example, there may be three bed bases. Bed bases of only one type may be provided. One or more transparent fuel support elements may be positioned above and/or below the partially translucent fuel support element for additional layers of depth, whilst providing as much light as possible. In other words, two bed bases may be spaced-apart, preferably vertically spaced-apart from each other. A bed base may overlie or overlap a further bed base. The lowest bed base may be a first bed base and the top two bed bases may be second bed bases. The terms "above" and "below" are intended to mean herein and throughout when the bed bases are in use. It is to be understood that when the electric fire apparatus is not in use, a bed base may not necessarily be above or below a further bed base.

For instance, in a disassembled condition or in a kit condition, the electric fire apparatus may be rotated or positioned on a side. The bed bases in this alternative may not be spaced-apart from each other, and/or may not be spaced-apart vertically. A plurality of first mesh elements and/or a plurality of second mesh elements may be associated with any of: the electric fire apparatus, the first bed base, the second bed base, the front bed base portion of any or all bed bases, the rear bed base portion of any or all bed bases. Alternatively, any mesh element may be omitted from any of the above.

The first mesh element may be connected to a frame and/or the housing to be taut, by any number of its edges and/or by being taut between an edge and one or more points, or even between three or more spaced-apart points or anchors. The anchors may even be spaced-apart from the edge or edges of the mesh element. Whilst planar and/or taut in this embodiment, the first mesh element may alternatively be sufficiently loose or slack to be moveable, for instance under a current or jet of air. Said air may be provided by the heating element. The movability may increase further the realism of the flame effect by providing additional depth and/or softening or blurring any edges of a projected light or image, although this may be to the detriment of the lighting projected onto the screen if a specific arrangement and/or position of the screen is required for a crisp flame effect.

It could be easily be envisioned that the front and rear bed base portions of any of the bed bases may be separate, connected or connectable, separably or not, with each other instead of integrally formed. Furthermore, the rear and front bed base portions may be co-planar and/or parallel with each other, or neither parallel nor co-planar with each other. A bed base portion may even be non-planar such that they may be partly curved. This may better retain the imitation fuel. Any one of the front bed base portion and the rear bed base portion of any of the bed bases may be omitted and in any combination. Although the strip is preferably considered to be part of the rear bed base portion, the strip may be considered to be part of the front bed base portion, instead or in addition to the rear bed base portion. The strip may even be considered to be part of neither. Furthermore, although the strip is integrally formed with both front and back portions, it may alternatively be connected or connectable to either or both the front and back bed base portions. The strip may be omitted altogether such that the front and back bed base portions may be spaced apart from each other. There may even be a plurality of strips. The or at least one lighting source may be positioned anywhere in relative to the bed bases, including above, such as on the ceiling and/or from the back wall, by way of examples instead of or in addition to below one or both bed bases. Thus, the or at least one light source may not necessarily direct light through at least one or all bed bases. At least one light source may direct light onto any of: the front bed base portion, the rear bed base portion, a screen, a first mesh element, and a second mesh element.

It could even be envisioned that at least one or each transparent portion of the first bed base, whether the strip or the fuel-shaped transparent portions of the lower bed base, may be omitted entirely. Either or all fuel support elements may be devoid of any transparent portion altogether. Any translucent portion may be omitted. Any translucent or partly translucent screen may be transparent or partly transparent instead. The fuel support element may even comprise holes, gaps or apertures, to further increase the amount of light going through each log. It may even be envisioned that the imitation fuel and the fuel support element of the upper and/or lower bed bases may even be connected together and/or moulded together. The imitation fuel may be shaped directly out of the fuel support element. Although C-shaped here, each fuel element may have any cross-section such as curved, non-curved, partly curved, partly or fully polygonal. The cross-section may even change along the length of a fuel element. Two logs may have completely different shapes and/or sizes relative to each other. Furthermore, whilst imitation wood logs are the preferred imitation fuel, alternative or additional imitation fuel may be envisioned in addition to or instead of fuel for aesthetic reasons. Alternatives include real logs, coals, driftwood, twigs or any other suitable fuel, pebbles, ceramics, crystals, marbles, glass portions, glass spheres, stones, dirt, sand, or any other suitable article or substrate, for example to emulate a camp fire on the beach.

There is one partitioning element in the second and third embodiments and two partitioning elements in the first embodiment, but it may be envisioned that any number of, preferably spaced-apart, partitioning elements could be provided, including none, one or a plurality. A partitioning element may be associated with any part of a bed base. Although the partitioning element extends all the distance between the bed bases, it could be envisioned that the partitioning element may only extend from one bed base, such as extending upwards from the first bed base, or down from the second bed base. The partitioning element may be integrally formed with, connected or connectable with only one bed base. The partitioning element may even be integrally formed with or contact neither bed base, for instance, by being connected to the side walls or lateral sections of the housing. In this case, the partitioning element may not need to be rigid, such that it could be pliable and/or stretched. The partitioning element may be omitted entirely. The upper fuel bed base may be laid on top of the lower fuel bed base, whether directly on the fuel support element or on the imitation fuel of the lower fuel bed base. Although the partitioning element preferably comprises a plate in order to fulfil all of its functions, the partitioning element may alternatively comprise a plurality of strips or pillars and/or brackets, supports or battens connected or connectable to the housing. The partitioning element may even be one or more strings, ropes or chain elements or other suitable suspensive means which may suspend the bed bases from the ceiling of the housing. Instead of being integrally formed with one or both bed bases, the partitioning element may alternatively be connected, connectable, contacted, or abuttable against either or both bed bases, whether with the imitation fuel and/or, preferably, the fuel support element or fuel support elements. Instead or in addition to a spindle, a flickering flame effect may be provided by any or any number of: an LCD light or lighting display, a pulsating LED light, or an LED screen, or a combination of any of the above. The LED may project a range of colours, and/or patterns. The LED screen may be fixed or movable. An LED screen may be connected to any or any combination of parts of the grounding portion, such as the ground-facing section, the front facing section or wall, and a rear section or wall. An LED screen may be rotatable around a spindle. The LED screen may be rotatable about a horizontal axis. Additionally, or alternatively, the LED screen may be rotatable about a vertical axis. Any of the fixed or stationary mirrors or mirrored strips are preferably permanently engaged or connected with the housing in the present embodiment, for ease of assembly and/or ensuring the correct orientation and angles. However, any mirror or mirrored strip may be separably engageable or connectable with the housing. Although any reflective element or feature comprises mirror in the above embodiments, non-mirror alternatives may be envisioned, such as any suitable reflective material. This may include reflective or metallicized plastics, a reflective sheet, foil, film or coating, such as tin foil. The material may reflect light only by virtue of its colour. For instance, the reflective material may be white or light-coloured, shiny or bright. Any suitable material may be envisioned such as fabric, paper, plastics, paint, a coating, a foil, or a film.

Any of the major front surface, small ledge, and third surface of the front facing section may be omitted or added in any embodiment. The third surface may even be a portion of the front mirrored strip. The major section of the front mirrored strip may be parallel and/or coplanar with the third surface, or may even replace the third surface entirely. The mirrored strip may be connectable to, connected directly with the major front surface. The mirrored strip may extend directly from the front facing section and/or third surface towards the rear of the electric fire apparatus. The electric fire apparatus may also comprise a speaker element, not shown, for instance for playing typical fire sounds, such as crackling. The mesh element may be particularly advantageous as transmitting well any acoustics from a speaker rearward of the mesh element and/or does not or does not substantially dampen the sounds therefrom.

Whilst in any of the above embodiments, the first fixed mirror and, if provided, the second fixed mirror, meet the front facing section and the rear wall respectively at an angle, it may easily be envisioned however that either or both the first and second fixed mirrors may not meet with the front facing section and the rear wall respectively. The first fixed mirror may not be positioned at an angle relative to the front facing section. The second fixed mirror may not be positioned at an angle relative to the rear wall. In one alternative arrangement, the first fixed mirror may be co-planar or parallel with the front facing section. In other words, the first fixed mirror may extend along, be abuttable against or flush with the inner face of the front facing section. In use, the first fixed mirror may be or be substantially vertical. Similarly, if a second fixed mirror is provided, the second fixed mirror may be co-planar or parallel with the rear wall. In other words, the second fixed mirror may be abuttable against, flush with or extend along the rear wall. As such, the second fixed mirror may be or be substantially vertical in use. Optionally, in addition to or instead of being associated with the third surface, the or a light source may be associated with or provided on the first and/or second fixed mirror. The light source may be level or substantially level with the front and/or rear rotatable mirror, although anywhere above or below and/or anywhere along the vertical extent of either or both fixed mirrors may be envisioned. The light source may be oriented so as to emit light towards either, both, any or all rotatable mirrors.

It is therefore possible to provide an imitation fireplace having most or all the advantages of an imitation fireplace over a live fire whilst providing a more realistic or improved simulated fire. It is therefore also possible to provide a method of use of an imitation fireplace which provides an improved simulated fire effect. The words 'comprises/comprising' and the words 'having/including' when used herein with reference to the present invention are used to specify the presence of stated features, integers, steps or components, but do not preclude the presence or addition of one or more other features, integers, steps, components or groups thereof. It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination. The embodiments described above are provided by way of examples only, and various other modifications will be apparent to persons skilled in the field without departing from the scope of the invention as defined herein.

The invention claimed is:

1. An electric fire apparatus having an improved simulated fire effect, the apparatus comprising a first bed base which is at least in part light-transmissible, the first bed base comprising a fuel support element having a transparent portion and a translucent portion, an opaque and/or translucent partitioning element which occludes the transparent portion of the fuel support element from view when the electric fire apparatus is in-use, an at least in part light-transmissible second bed base above the first said bed base, a holographic mesh element as hereinbefore defined which divides the second bed base into a front bed base portion and a rear bed base portion; and at least one light source to direct light through the front and/or rear bed base portions.

2. The electric fire apparatus of claim 1, wherein the second bed base comprises a transparent fuel support element.

3. The electric fire apparatus of claim 1, wherein the transparent portion is shaped as an elongate strip, positioned in-use below the holographic mesh element to permit light from the at least one light source to be directed therethrough onto the holographic mesh element to provide a simulated flame effect.

4. The electric fire apparatus of claim 3, wherein the strip is positioned rearwards relative to the holographic mesh element.

5. The electric fire apparatus of claim 1, wherein the first and second bed bases are spaced apart by a distance, and the partitioning element extends or substantially extends over at least a majority of the distance between the first and second bed bases.

6. The electric fire apparatus of claim 1, further comprising an imitation fuel element which is at least in part light-transmissible.

7. The electric fire apparatus of claim 6, wherein the fuel support element of the first bed base comprises a further transparent portion and the imitation fuel element is positioned on the said further transparent portion to receive light through the said further transparent portion.

8. The electric fire apparatus of claim 7, wherein the further transparent portion is or is substantially complementarily shaped to the imitation fuel element, and the imitation fuel element is at least in part translucent and/or semi-transparent such that when it overlies the further transparent portion, the further transparent portion is or is substantially occluded.

9. The electric fire apparatus of claim 1, wherein the first said bed base further comprises a second holographic mesh element.

10. The electric fire apparatus of claim 1, wherein at least one of the first said bed base and the said second bed base further comprises a second holographic mesh element.

11. The electric fire apparatus of claim 9, wherein the second said holographic mesh element is pliable.

12. The electric fire apparatus of claim 1, further comprising at least one of the following: wherein at least the first said bed base slopes upwardly in a front to back direction of the apparatus; wherein the first said holographic mesh element is extendable in a plane, said plane extends non-perpendicularly to the first said bed base; and wherein the first said holographic mesh element is pliable.

13. The electric fire apparatus of claim 1, further comprising at least one of the following: wherein the second bed base slopes upwardly in a front to back direction of the electric fire apparatus; and wherein the first said bed base is parallel to the second bed base.

14. The electric fire apparatus of claim 1, further comprising a housing having a back wall, a ceiling and two side walls, the housing further optionally comprises a front screen.

15. The electric fire apparatus of claim 1, provided as a kit of parts.

16. A method of providing an improved simulated fire effect, the method comprising the steps of: a] providing an electric fire apparatus as claimed in claim 1; and b] shining light through the or each bed base.

* * * * *